(12) United States Patent
Marom et al.

(10) Patent No.: US 10,994,983 B2
(45) Date of Patent: May 4, 2021

(54) CONTROLLED POURER AND A METHOD FOR MANAGING AND MONITORING LIQUOR CONSUMPTION

(71) Applicant: NINA labs LTD., Binyamina (IL)

(72) Inventors: Yair Marom, Binyamina (IL); Tal Lotan, Ramat gan (IL)

(73) Assignee: NINA LABS LTD., Binyamina (IL)

( * ) Notice: Subject to any disclaimer, the term of this patent is extended or adjusted under 35 U.S.C. 154(b) by 0 days.

(21) Appl. No.: 16/547,674

(22) Filed: Aug. 22, 2019

(65) Prior Publication Data

US 2020/0115215 A1 Apr. 16, 2020

Related U.S. Application Data

(60) Provisional application No. 62/721,164, filed on Aug. 22, 2018.

(51) Int. Cl.
*B67D 3/00* (2006.01)
*G05D 7/06* (2006.01)

(52) U.S. Cl.
CPC ......... *B67D 3/0041* (2013.01); *B67D 3/0003* (2013.01); *G05D 7/0617* (2013.01); *B67D 3/0077* (2013.01); *B67D 2210/00083* (2013.01)

(58) Field of Classification Search
CPC ............... B67D 3/0041; B67D 3/0003; B67D 2210/00083; B67D 2210/0077; B67D 2210/00091; G05D 7/0617
See application file for complete search history.

(56) References Cited

U.S. PATENT DOCUMENTS

| | | | | | |
|---|---|---|---|---|---|
| 5,505,349 | A | * | 4/1996 | Peckels | B67D 3/0041 222/36 |
| 5,702,032 | A | * | 12/1997 | Loehrke | B67D 3/0006 222/63 |
| 6,662,976 | B2 | * | 12/2003 | Jensen | B67D 3/0003 222/481.5 |
| 6,892,166 | B2 | * | 5/2005 | Mogadam | B67D 1/00 222/1 |
| 7,900,799 | B2 | * | 3/2011 | Kuzar | B67D 3/0006 222/52 |
| 2008/0195251 | A1 | * | 8/2008 | Milner | B67D 3/0077 700/237 |
| 2009/0242075 | A1 | * | 10/2009 | Busick | A61L 2/10 141/85 |
| 2010/0038378 | A1 | * | 2/2010 | Gabler | B67D 3/0006 222/23 |

(Continued)

*Primary Examiner* — Donnell A Long
(74) *Attorney, Agent, or Firm* — Reches Patent

(57) ABSTRACT

A controlled pourer that may include a locking mechanism for locking the controlled pourer to a bottle; a communication module; a flow control mechanism that is configured to control an output of fluid, during a liquid consumption iteration, from the bottle under a control of one or more commands received by the communication module; and a flow meter for monitoring an amount of fluid outputted by the flow control mechanism during the fluid consumption iteration. The communication module is configured to output information regarding the amount of fluid consumed during the fluid consumption operation. Once locked to the bottle the controller pourer prevents a bypass of the fluid control mechanism.

20 Claims, 31 Drawing Sheets

(56) References Cited

U.S. PATENT DOCUMENTS

| | | | |
|---|---|---|---|
| 2011/0024453 A1* | 2/2011 | Fleisher | B65D 47/32 |
| | | | 222/113 |
| 2014/0263399 A1* | 9/2014 | Keating | B67D 3/0077 |
| | | | 222/1 |
| 2017/0275147 A1* | 9/2017 | Moezidis | B67D 3/0096 |

* cited by examiner

61

63

200

US 10,994,983 B2

CONTROLLED POURER AND A METHOD FOR MANAGING AND MONITORING LIQUOR CONSUMPTION

BACKGROUND

It has been found that liquor is distributed, consumed and paid for in a very inefficient, inaccurate and a limiting manner. The amounts of consumed liquor are not properly measured, the amount and types of consumed liquor are not reported in a proper manner, and entire process is mostly manual—under the supervision of bartenders.

These is a growing need to provide an efficient, accurate, and user friendly manner to distribute, consume and pay for liquor.

SUMMARY

There may be provided a controlled pourer that may include (a) a locking mechanism for locking the controlled pourer to a bottle, (b) a communication module, (c) a flow control mechanism that is configured to control an output of liquor, during a liquid consumption iteration, from the bottle under a control of one or more commands received by the communication module, and (d) a flow meter for monitoring an amount of liquor outputted by the flow control mechanism during the liquor consumption iteration.

The communication module is configured to output information regarding the amount of liquor consumed during the liquor consumption operation.

Once locked to the bottle the controller pourer prevents a bypass of the liquor control mechanism. Accordingly—liquor may exit the bottle only through the flow control mechanism.

The controlled pourer may include a man machine interface. The man machine interface (MMI) may include audio and/or visual elements for inputting or outputting human perceivable signals. The MMI may include, for example one or more LEDs and/or one or more speakers and/or microphones for interacting with a human.

The MMI may provide an indication regarding a progress of the outputting of the liquor, whether the user may request to initiate a liquor consumption iteration and the like.

There may be provided a method for controlled distribution of liquid from a bottle, the method may include receiving, by a communication module of a controlled pourer, a command to output the liquid from the bottle during a liquid consumption iteration; outputting the liquid from the bottle through a flow control mechanism according to the command, during the liquid consumption iteration; monitoring, by a flow meter of the controlled pourer, an amount of liquor outputted by the flow control mechanism during the liquor consumption iteration; outputting, by the communication module, information regarding the amount of liquor consumed during the liquor consumption operation; and preventing, by the controlled pourer, a bypassing of the flow control mechanism, while the controlled pourer is locked to the bottle.

The method may include providing, by a man machine interface of the controlled pourer, a human perceivable feedback regarding a progress of the outputting of the liquor.

The method may include receiving a command to output a predefined amount of liquor during the liquor consumption iteration and outputting the predefined amount of liquor during the liquid consumption iteration.

The method may include receiving a command to output a unspecified amount of liquor during the liquor consumption iteration and outputting the unspecified amount of liquor during the liquid consumption iteration.

The method may include receiving the command over a secure link from a user device; detecting whether an execution of the liquid consumption iteration is funded; and preventing the outputting of the liquor during the liquid consumption iteration when the execution of the liquid consumption iteration is not funded. The method may also involve verifying that the consumer of the liquor is old enough to consume the liquor.

There may be provided a method for managing and monitoring consumption of liquor, the method may include receiving, by a computerized systems, information regarding consumption of liquor from multiple bottles via multiple controlled pourers locked to the multiple bottles; and processing the information to provide liquor consumption statistics.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
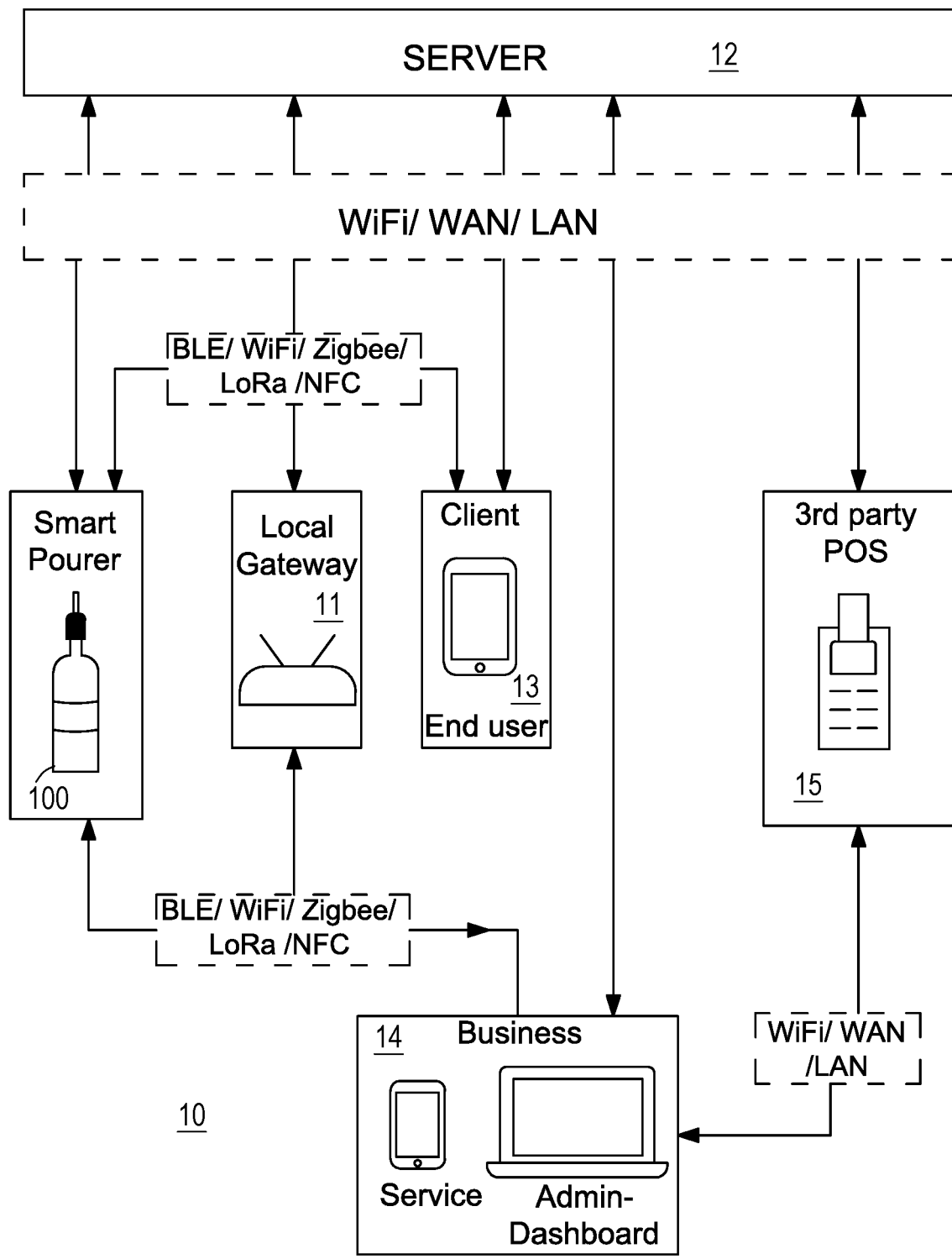
FIG. 1 illustrates an example of a controller pourer and its environment.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

There may be provided a system, method and a computer program product (herein—the solution) for distributing, controlled consumption and billing of liquor.

Instead of waiting to a bartender to pour an inaccurate amount of liquor—each consumer can control his own consumption (by requesting either the controlled pourer to pour a predefined amount of liquor and/or by monitoring the amount of liquor that is poured by the user—when operating in an "open bottle" mode), the amount of consumed liquor can be sent to the cloud and allow various distribution and control systems (along any distribution chain) to monitor in real time the consumption of each user, the controlled pourer may be controlled by an application installed in the user smartphone (or other IOT device), and the billing can be done using said application—without waiting to a bartender—thereby speeding up the process and making it fault proof.

Each user device of the user and/the controlled pourer itself may store at least a part of a real-time updated and compact data base indicative of liquor consumption. This real-time updated and compact data base may be uploaded to the cloud, may require only minor computational and storage resources. The at least part of the data base may stored in the user device and/or in the controlled pourer until, at least, its content is successfully downloaded by the cloud.

The user may be billed using any type of billing application, by providing billing information, and the like.

One user may pay (in advance or in real time) for the liquor consumed by another user. For example—one user my pay a certain amount and allocate this certain amount to the other user. The other user may be notified in any manner (directly, when entering a predefined location, and the like) about the credit—and may elect to use this credit or not.

One user may offer another user to buy him a drink—and the other user may accept or reject that offer. The offer and response may involve exchanging additional information between the users—using the devices (such as smartphones) of the users.

The suggested solution may update bar owners about the consumption of liquor—but the information regarding the consumption may be distributed (for example—under predefined access rules) to the entire supply chain—including local and/or international distillery, local and regional liquor suppliers and bars.

The controlled pourer may include a man machine interface such as a display, one or more light emitted sensors, a valve or spout, a locking mechanism and a communication unit. The controlled pourer may be a off the shelf product, any known controlled pourer, and the like.

A user may register to a service (for example by uploading an application), may provide billing information and then use the service to activate and deactivate the controlled pourer. For example—only a user that registered to a certain service may activate the controlled pourer and then instruct the controlled pourer to pour liquor (in one or more operational modes (such as predefined quantum of liquor—or "open" mode), whereas the billing information may be used by the service to bill the user in real time, while reporting the user about the consumption and the cost of the consumption.

The controlled pourer may be installed on the bottle—thus allowing the user to consume the liquor almost in any place—and not necessarily within a certain pub.

The controlled pourer may enter a sleep mode after being deactivated—thus reducing power consumption. The controller may generate an indication when activated.

The solution may include four components: Controlled pourer—(Bottle unit), Local gateway, End user App and Management dashboard and application.

The Bottle Unit may be a liquid measuring device that is assembled on each liquor bottle and is adapted to monitor the liquid flow, while sending the data to the cloud. The user device may host an app which allows the user to have a fast, convenient, waiter-free experience for liquor drinking, while also allowing the business to monitor the consumption, and interact with the clients directly.

Controlled Pourer

The controlled pourer may be installed on each bottle or vessel that contains fluid, and can monitor the amount of liquid that comes out from the bottle by using flow meter (such as ultrasonic or turbine or . . . ).

The controlled pourer has an electronic or mechanic one-way valve that prevents the liquid of coming in and out of the bottle, and it can be triggered to open or closed on demand.

Each controlled pourer is shaped and size to fit to a variety of bottle necks and should have the ability to seal and avoid air or liquid flow.

The controlled pourer may be configured to communicate with various end users directly or via local gateway by using possible communication technologies such as BLE/Wifi/Zigbee/LoRa/NFC/Z-Wave/6LowPAN/Gigfox.

Local gateway—which is an example of an intermediate system between the controlled pourers and other computers. It should be noted that the smart pourer may send the information while bypassing the local unit, and even by using the smartphone of the user.

A local unit that communicates with one or more controlled pourers, and enables real time control and information of the following: Connected bottles, Type of bottles, Amount of liquid in each bottle.

End user Application—The user will be able to select the desired bottle within the range of available bottles that are connected the local gateway and to select the amount of liquid to consume.

Management Dashboard—enables the service provider to have a Realtime view of the status of all the local gateways and the connected controlled pourer.

Management Application—enables the service provider to connect new bottles to the gateway and to update parameters to each bottle. The management application may also (in addition to connecting bottles), provide the service provider an option to set rules to enforce responsible drinking and enforce laws (for example hours to sell alcohol, limit amount of drinking for customers etc. . . . ).

The system in general and the management application may provide a business admin control functionality.

This may include providing a full customization for the business owner to increase operational efficiency, enforce responsible drinking and remotely controls the all bottles.

Enforcement of responsible drinking model—the business admin control console may enable responsible drinking enforcement (something that to my knowledge no one does in an automated way today). The service provider that uses the system can set rules (to meet the responsible drinking guideline guideline) like:

Limiting the hours\ days for drinking—set the time in day, days in week—where spirits liquid can be poured. If it is off hours no liquor can be poured thanks to the smart locking mechanism, of the TOT pourer. For example: there are states\ venues that selling alcohol after midnight is forbidden.

Limiting the amount of pouring—limit the amount of pouring at the level of a person, tab or space. Limiting the amount can be done by setting amount in OZ. At the person level there is also an option to limit by BAC.

Remotely lock & close all spirits in a certain space, by a bottle or at the venue.

The system may enable to provide a method to price alcohol that may include a "By the drop" pricing model— setting pricing by the oz—new pricing model that allows the venue owner to set the price of a unit of 0.1 oz. today the pricing is by a defined amount of a shot or double shot (=1.25 oz or 1.5 oz depends on the venue).

The customer application may be programmed to perform identity authentication & age verification—based on multiple sources and technologies including face recognition, DMV id scanning, IOS\ Andriod mobile health personal health data (with user permission). This provide an automated and a faster way to verify the person is not underage.

There may be provided a controlled pourer that may include (a) a locking mechanism for locking the controlled pourer to a bottle, (b) a communication module, (c) a flow control mechanism that is configured to control an output of liquor, during a liquid consumption iteration, from the bottle under a control of one or more commands received by the communication module, and (d) a flow meter for monitoring an amount of liquor outputted by the flow control mechanism during the liquor consumption iteration.

The communication module is configured to output information regarding the amount of liquor consumed during the liquor consumption operation.

Once locked to the bottle the controller pourer prevents a bypass of the liquor control mechanism. Accordingly— liquor may exit the bottle only through the flow control mechanism.

The controlled pourer may include a man machine interface. The man machine interface (MMI) may include audio and/or visual elements for inputting or outputting human perceivable signals. The MMI may include, for example one or more LEDs and/or one or more speakers and/or microphones for interacting with a human.

The MMI may provide an indication regarding a progress of the outputting of the liquor, whether the user may request to initiate a liquor consumption iteration and the like.

Figure 2:
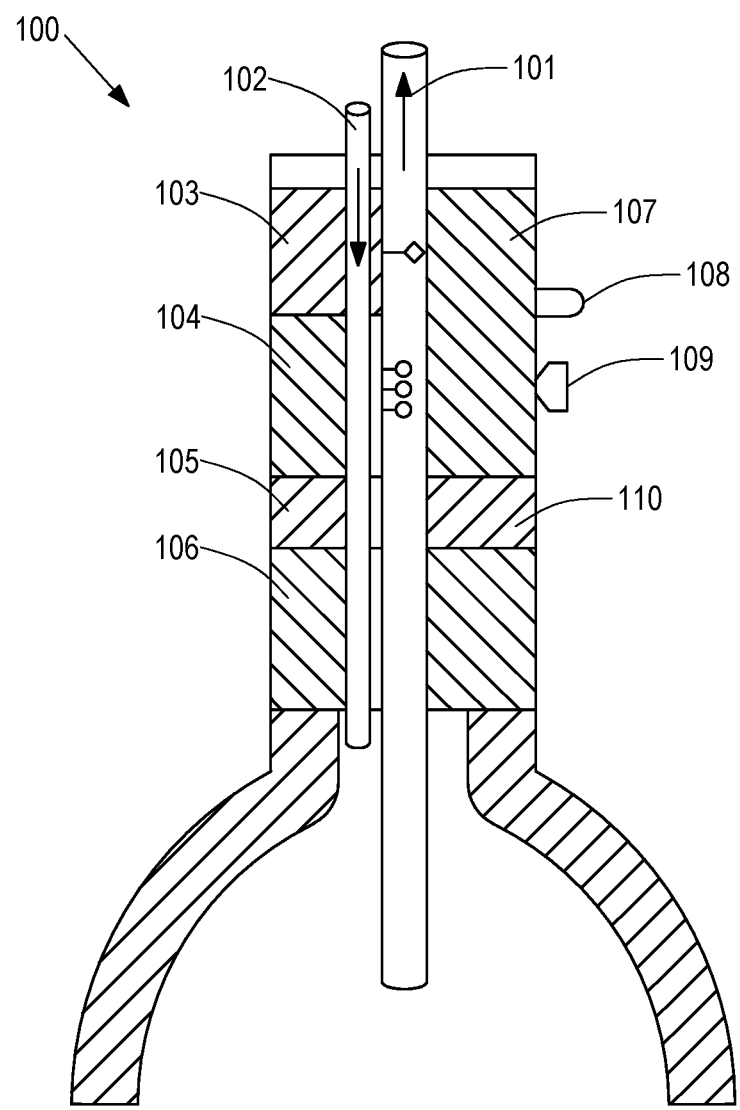
FIG. 2 illustrates an example of a controlled pourer
Figure 3:
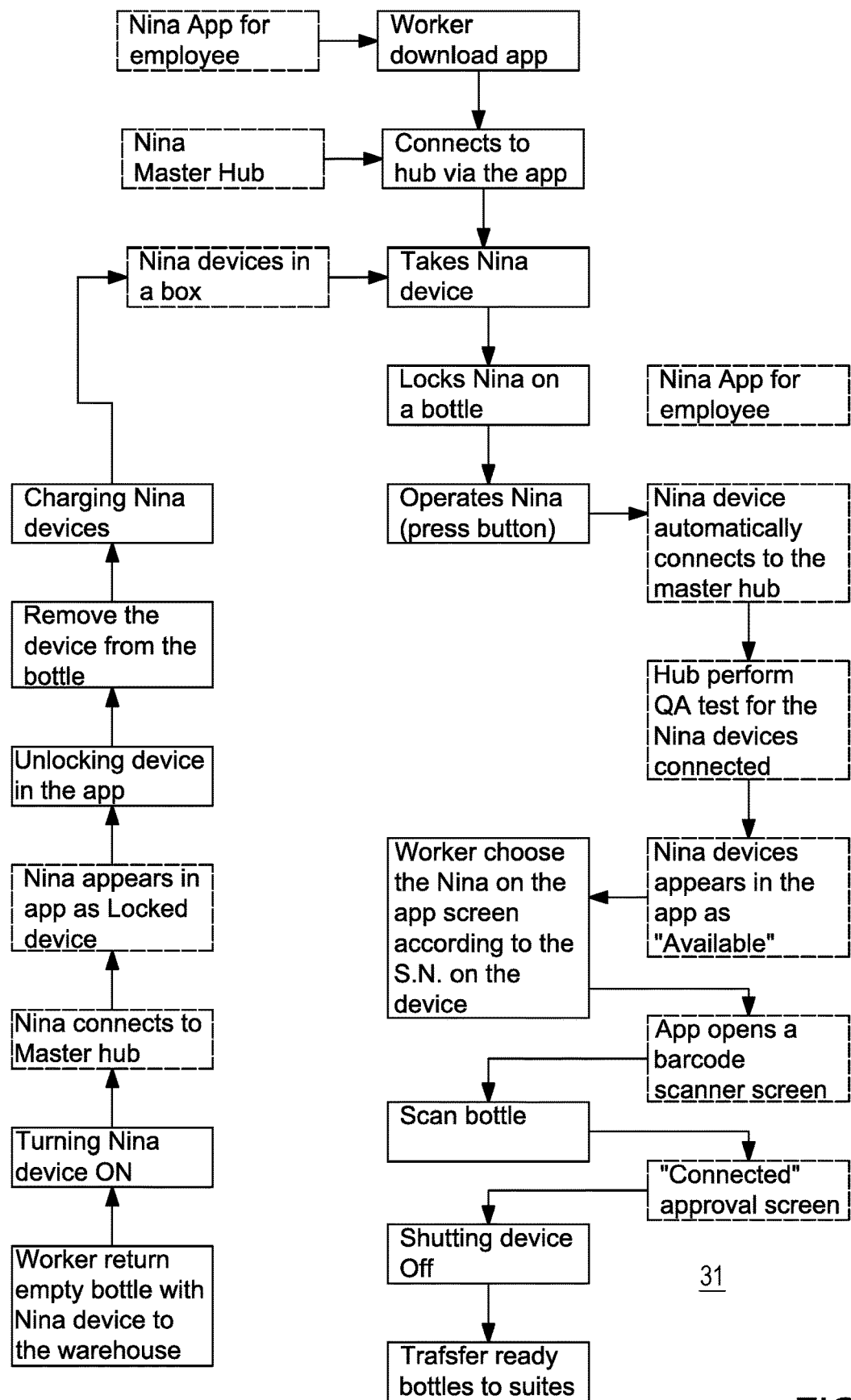
FIGS. 3-7 illustrate various processes executed by one or more participants and/or computerized systems and/or the controlled pourer.
Figure 4:
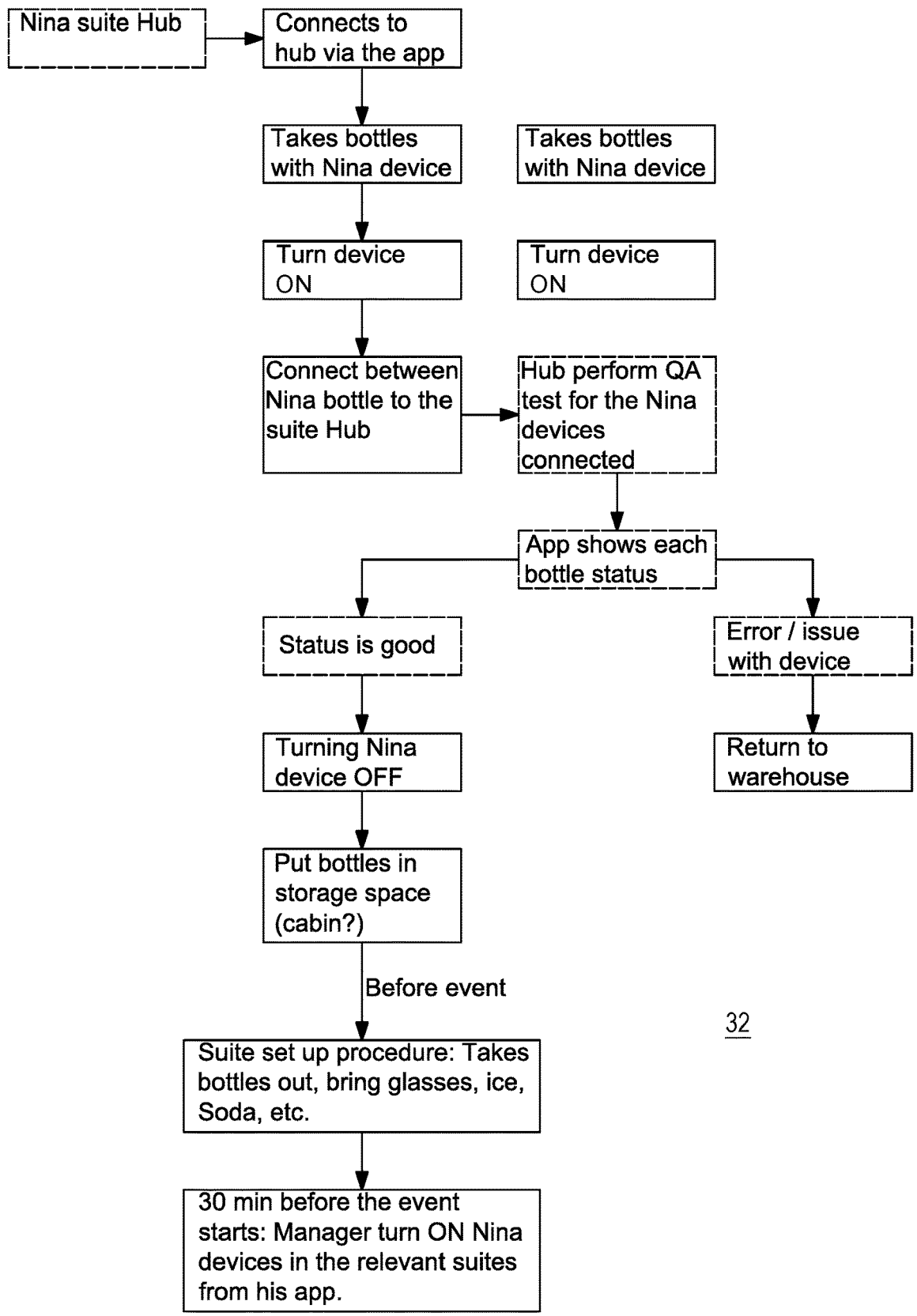
Figure 5:
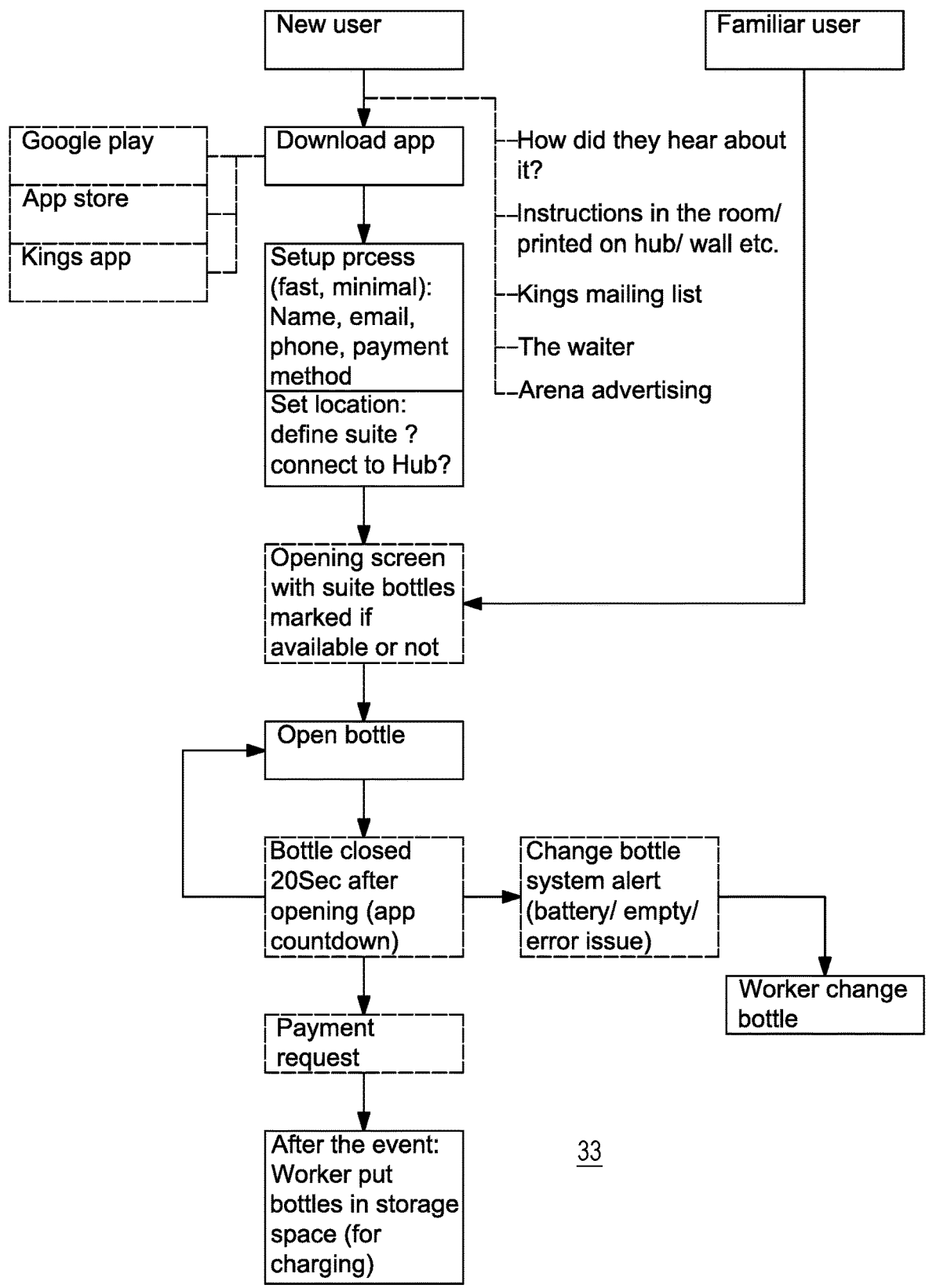
Figure 6:
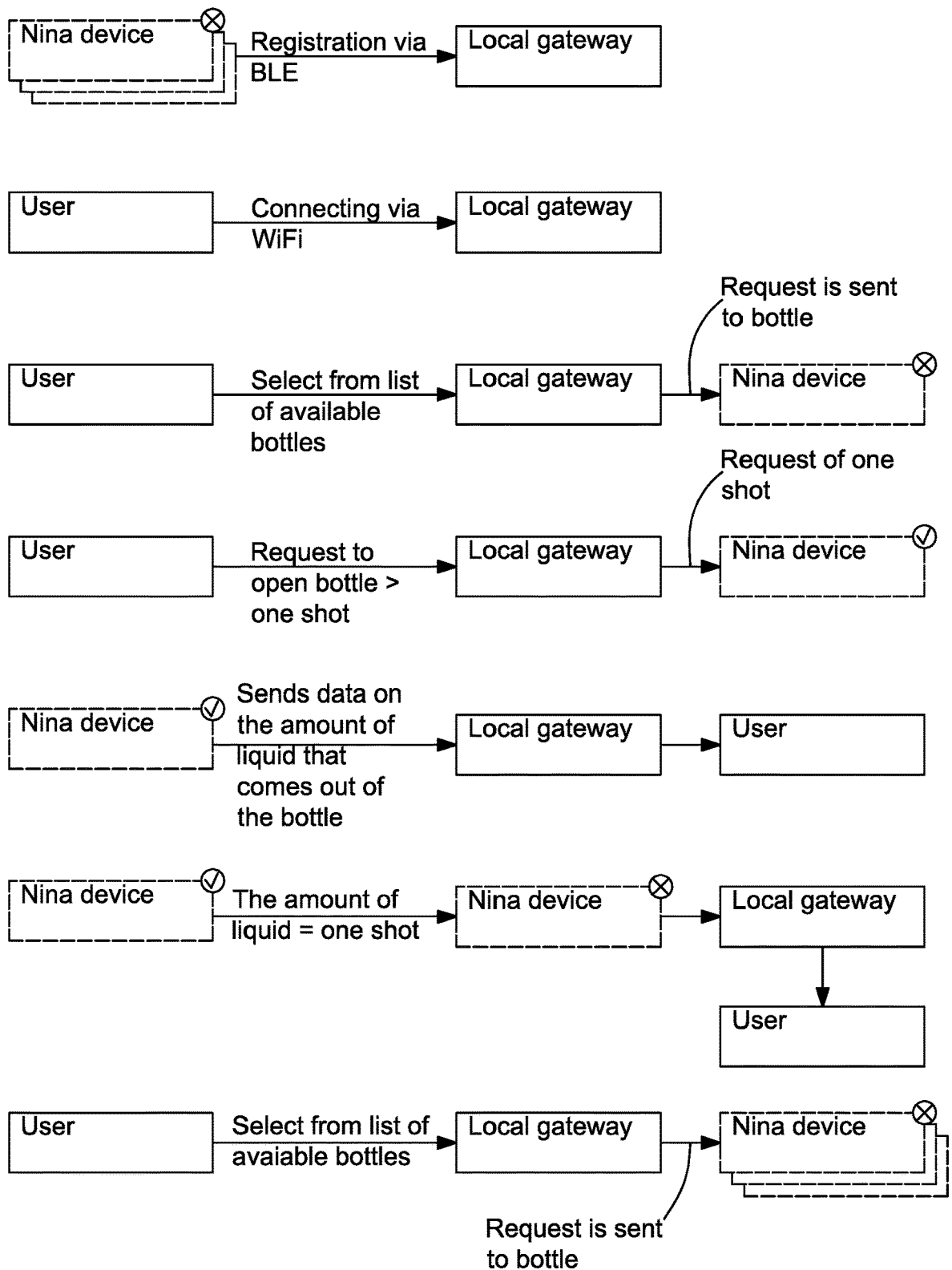
Figure 7:
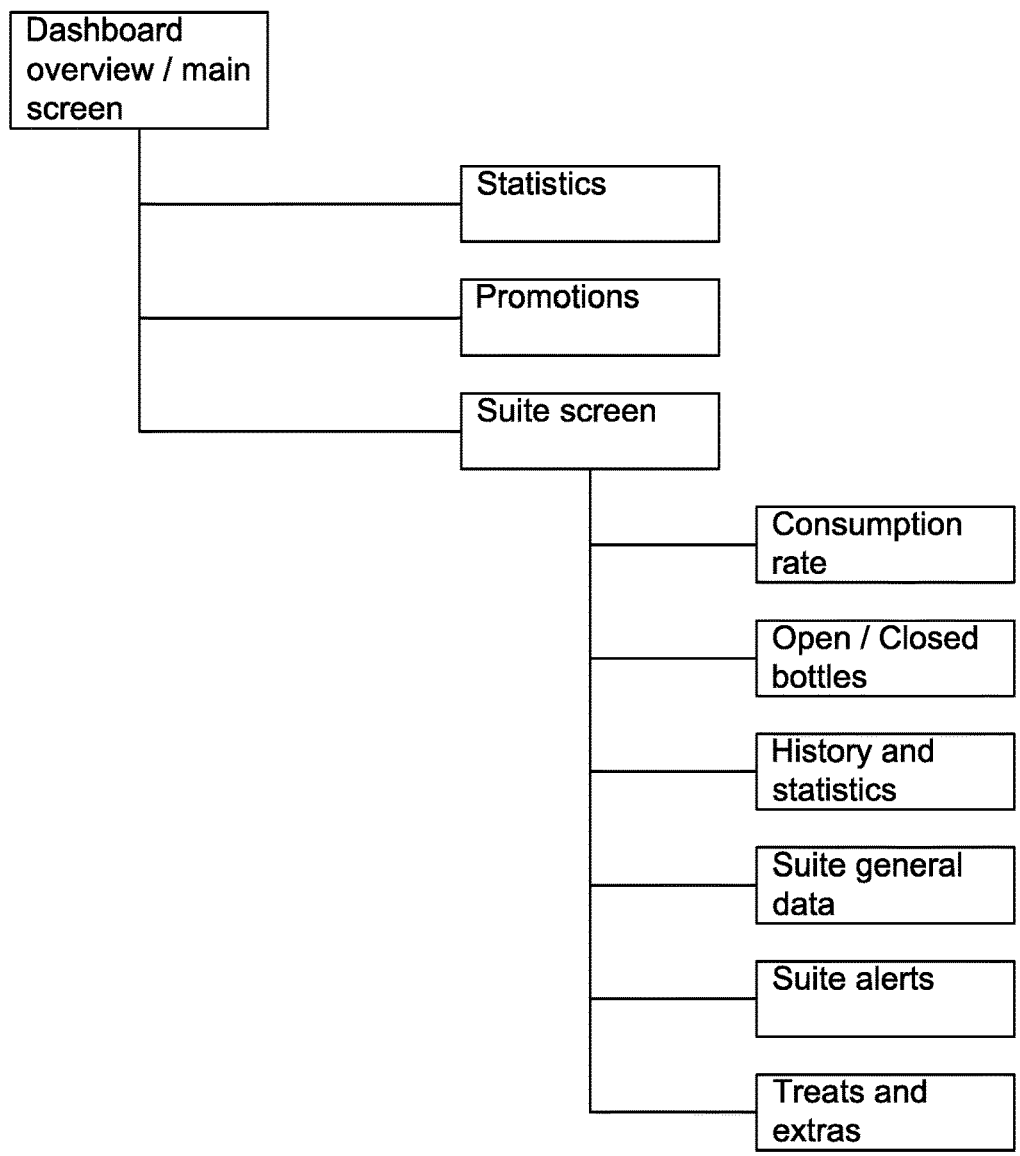

FIG. 2 illustrates a controlled pourer 10 that includes an air inlet 102, a liquid outlet 101, an automatic valve 103 (that may belong to the flow control mechanism), a flow meter 104, a battery 105, a charging element 110, a locking unit 106, MMI elements such as LED 108 and buzzer 109, a communication module such as BLE communication module 107.

The flow control mechanism may selectively close and open the air inlet 102, and the liquid outlet 101 thereby controlling the flow of liquor from the bottle.

FIG. 2 also illustrates that once the controlled pourer 10 is locked to the bottle—the fluid cannot be poured from the bottle—except through the flow control mechanism.

In FIG. 2 the controlled pourer 10 surround the neck of the bottle and when the flow control mechanism is closed (does not allow the output of liquor from the bottle)—the controlled pourer 10 seals the opening of the bottle.

The locking mechanism may be unlocked thus allowing a release of the controlled pourer 10 from the bottle—for example when the bottle is emptied.

The controlled pourer 10 may output the liquor in various manners.

For example—the flow control mechanism can be configured to output a predefined amount of liquor (for example one shot of liquor) during the liquid consumption iteration when receiving a command to output the predefined amount of liquor. The cost of the predefined amount is known in advance and the customer may be billed accordingly.

Yet for another example—the flow control mechanism is configured to output an unspecified amount of liquor during the liquid consumption iteration when receiving a command to output the unspecified amount of liquor. The cost of the unspecified amount is unknown in advance and the customer will be billed according to the amount of liquor consumed (measured by the flow meter) during the entire liquid consumption iteration.

The controlled pourer may be compact and light weight— to fit bottles of liquor—for example bottles of up to 1.5 liters. For example—a weight of the controlled pourer may not exceed a fraction (for example up to one half) of a kilogram. The height of the controlled pourer may be small—for example may not exceed ten centimeters.

The communication module 107 may be a BLE compliant communication module. The communication module 107 may communicate in any other communication protocol— especially low power wireless communication modes.

FIG. 1 illustrates a controlled pourer 100 and its environment.

The controller pourer may communicate with other computerized systems.

The controlled pourer—and even multiple controller pourers may communicate in various manners with other entities such as server 12, a client installed on a user device 13, a local gateway 11, one or more computers of a business that may provide various services such as liquor consumption analysis, billing, may also communicate with a point of sale terminal (POS) 15.

The controlled pourer 100 and at least some of these computerized devices may form a system that may monitor the consumption of liquor, selectively enable consumption of liquor, perform storage management, inventory management, liquor consumption trend analysis, manage billing, determine when an empty bottle should be replaced, may generate an alert when a certain user consume an unreasonable amount of liquor, may distribute information, requests and suggestions to consume liquor at certain points of time, during certain events, and the like. Using social media and/or other manners one user may pay for a liquor consumption of another user, and the like.

The liquor consumption may be managed in various manners. For example—using any control or management process.

FIGS. 3-7 illustrates various processes 31, 32, 33, 34 and 35 executed by one or more participants and/or computerized systems and/or the controlled pourer.

Figure 8:
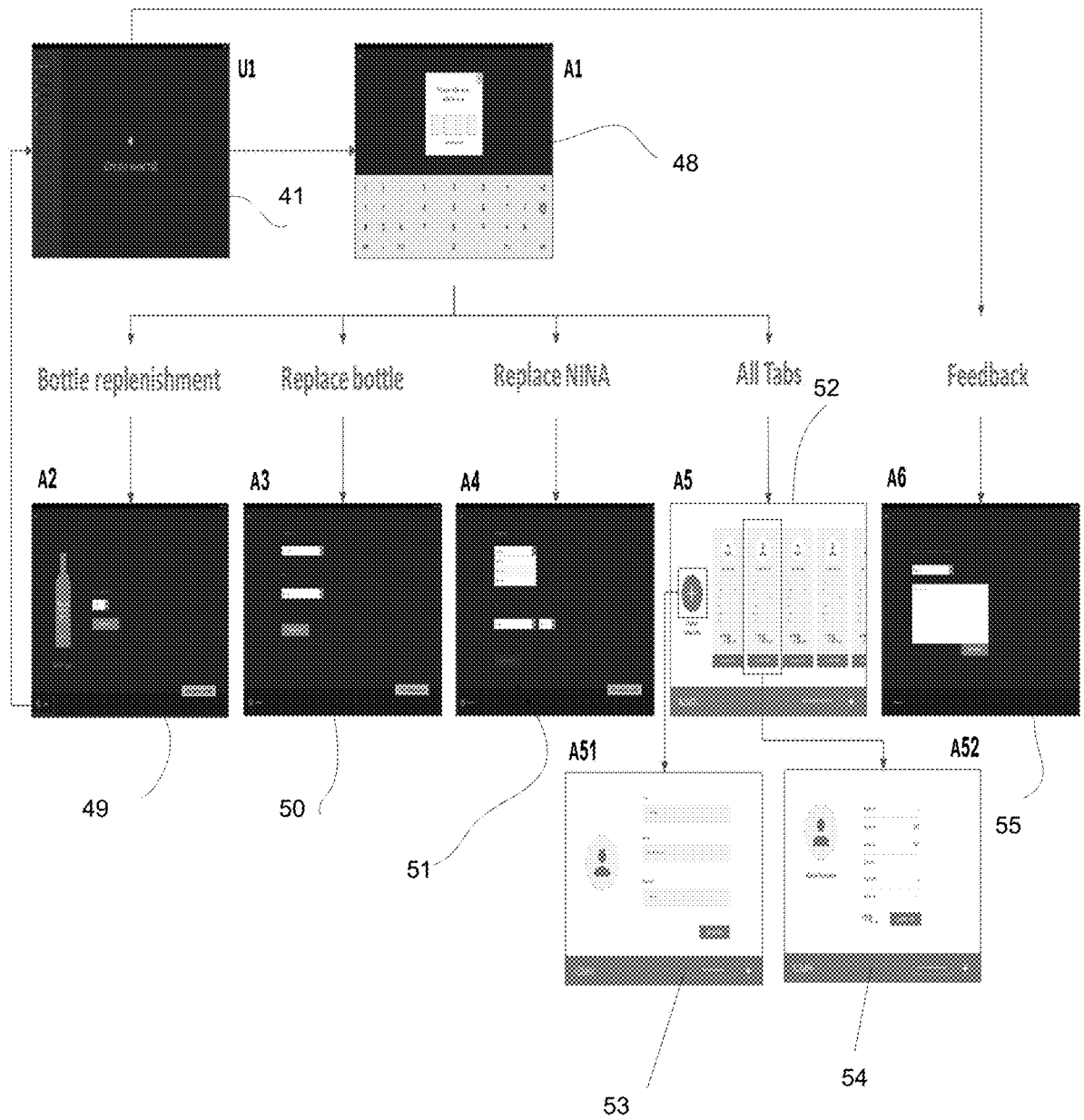
FIG. 8 illustrates examples of screen shots that appear during various operations related to liquor consumption, monitoring and management.
Figure 9:
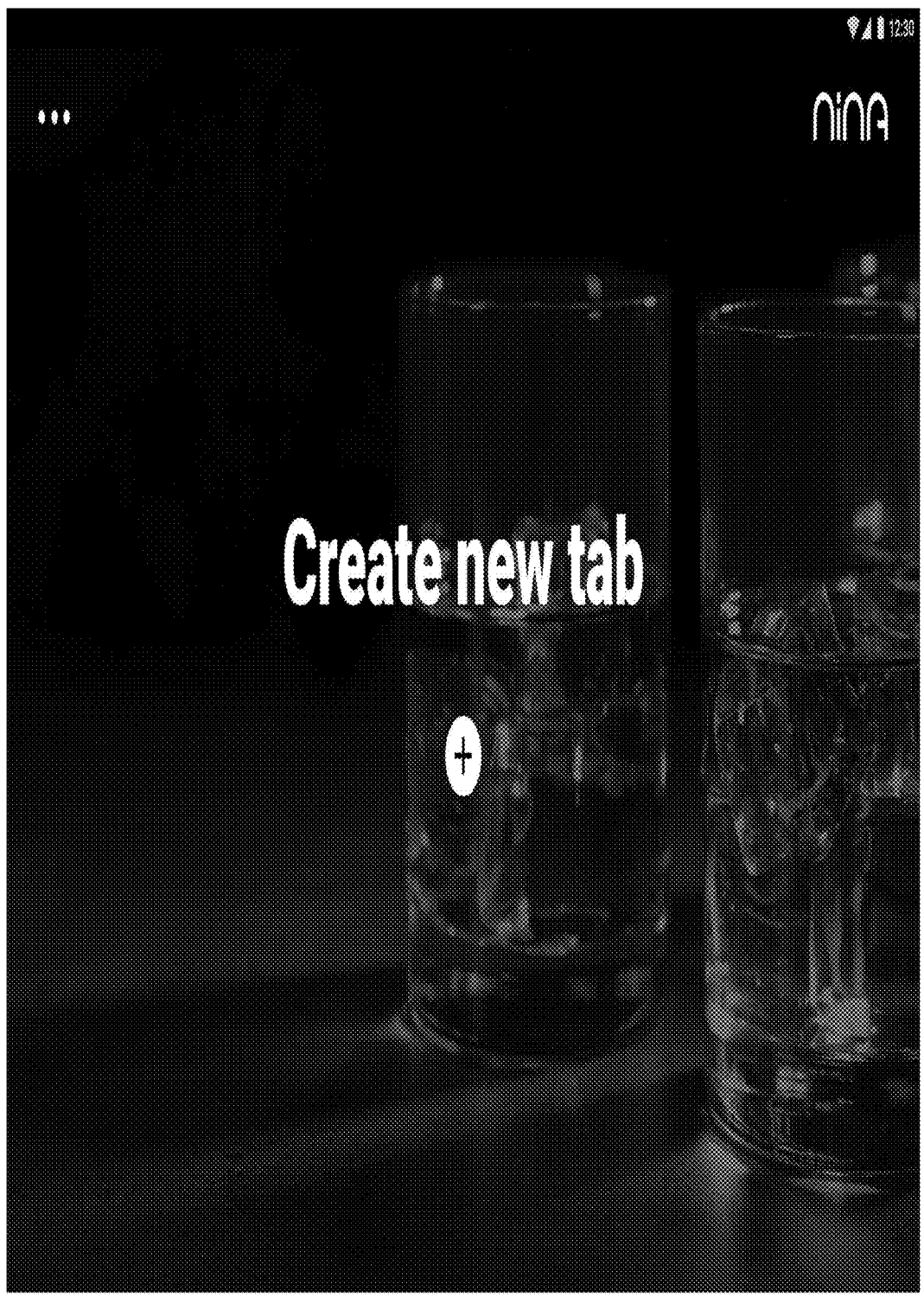
FIGS. 9-17 illustrate examples of screen shots.
Figure 10:
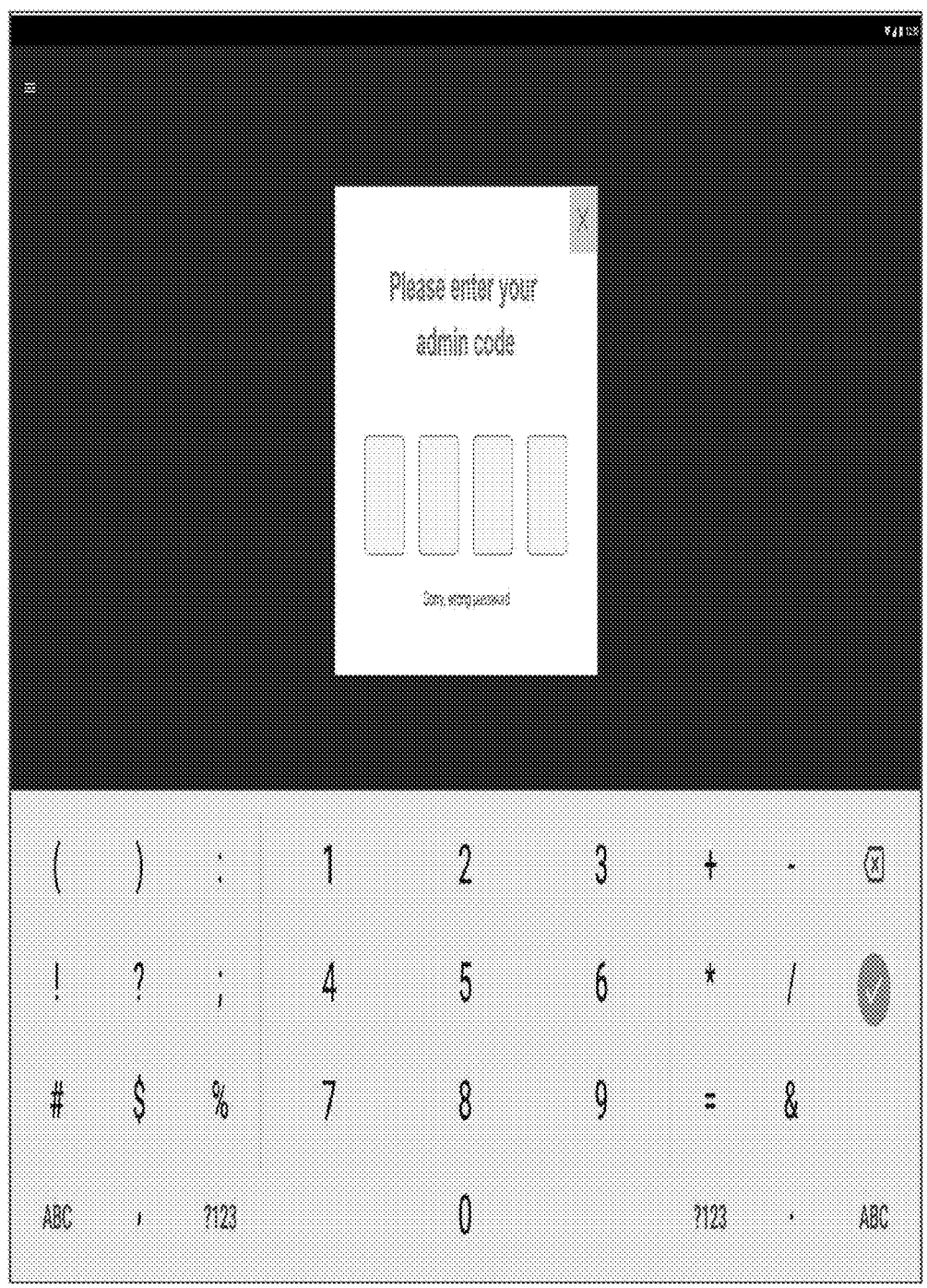
Figure 11:
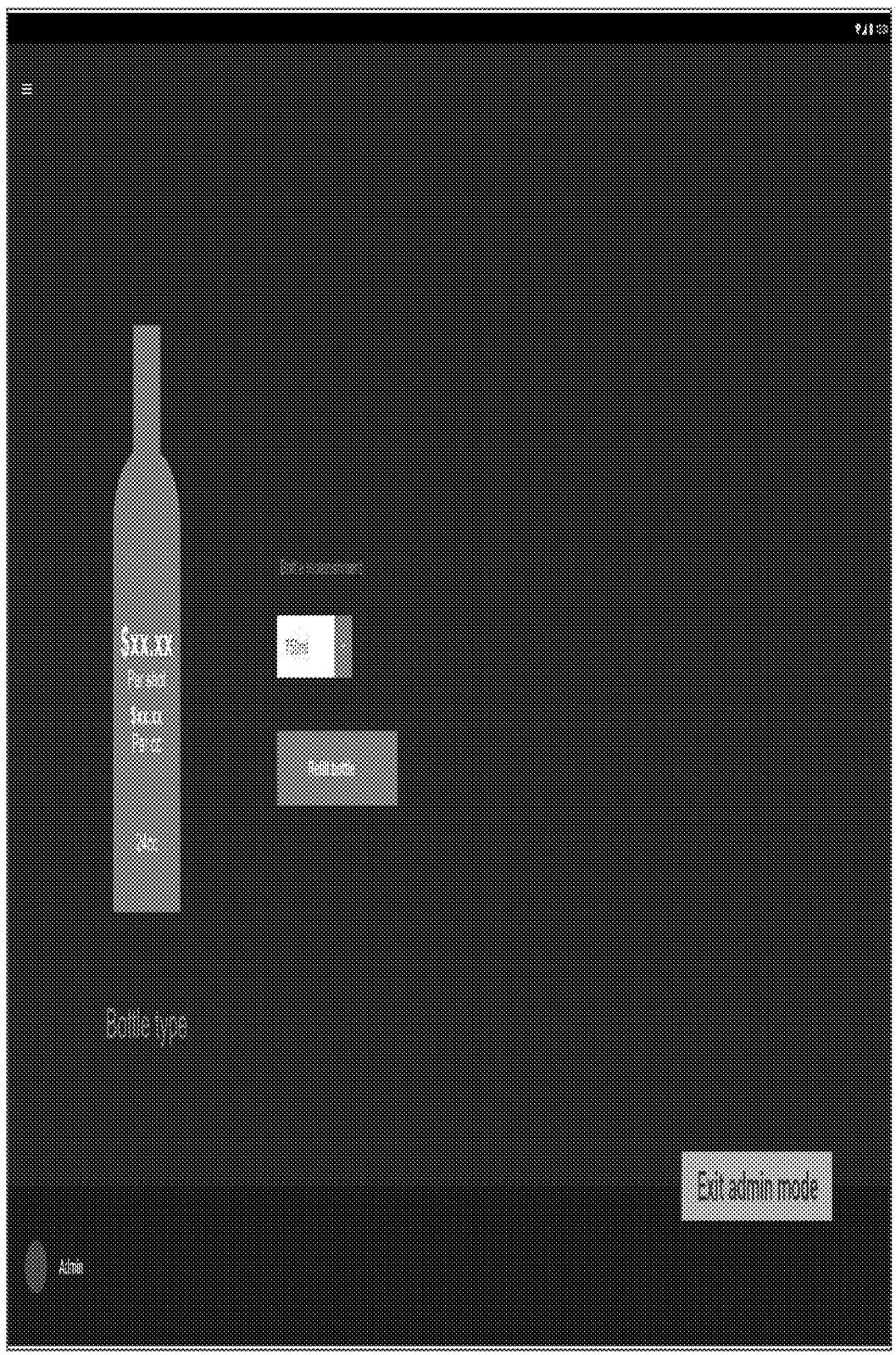
Figure 12:
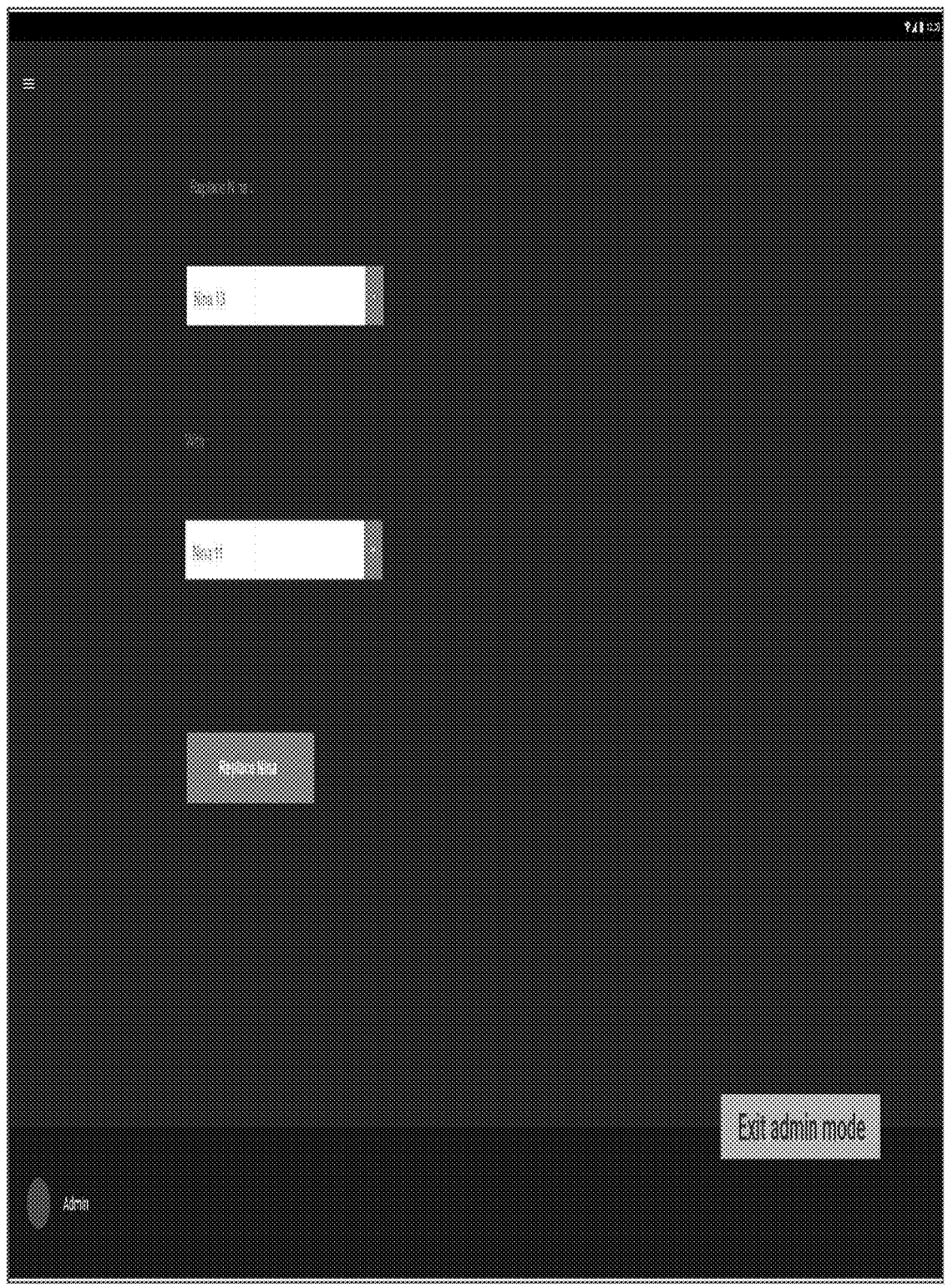
Figure 13:
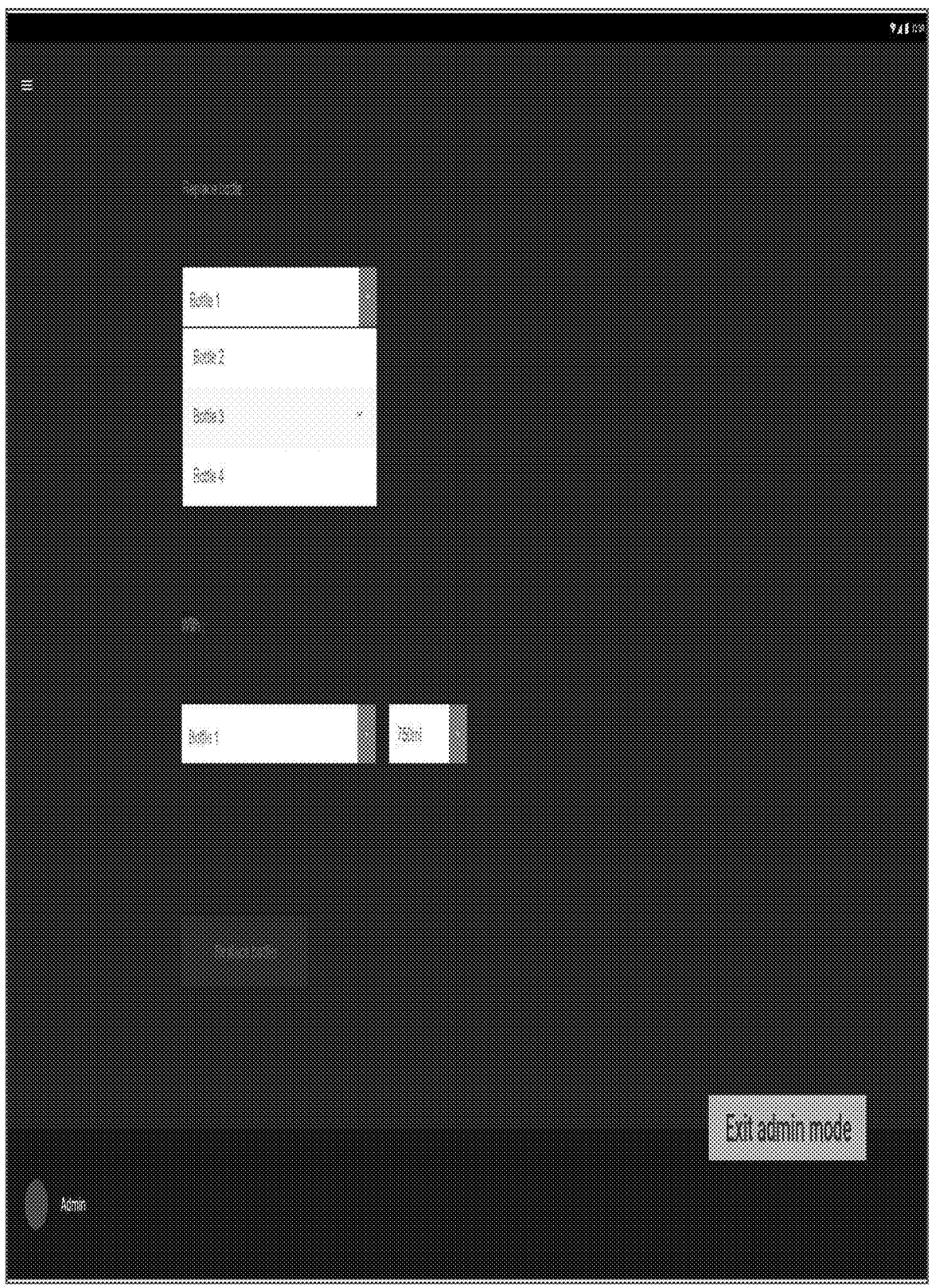
Figure 14:
Figure 15:
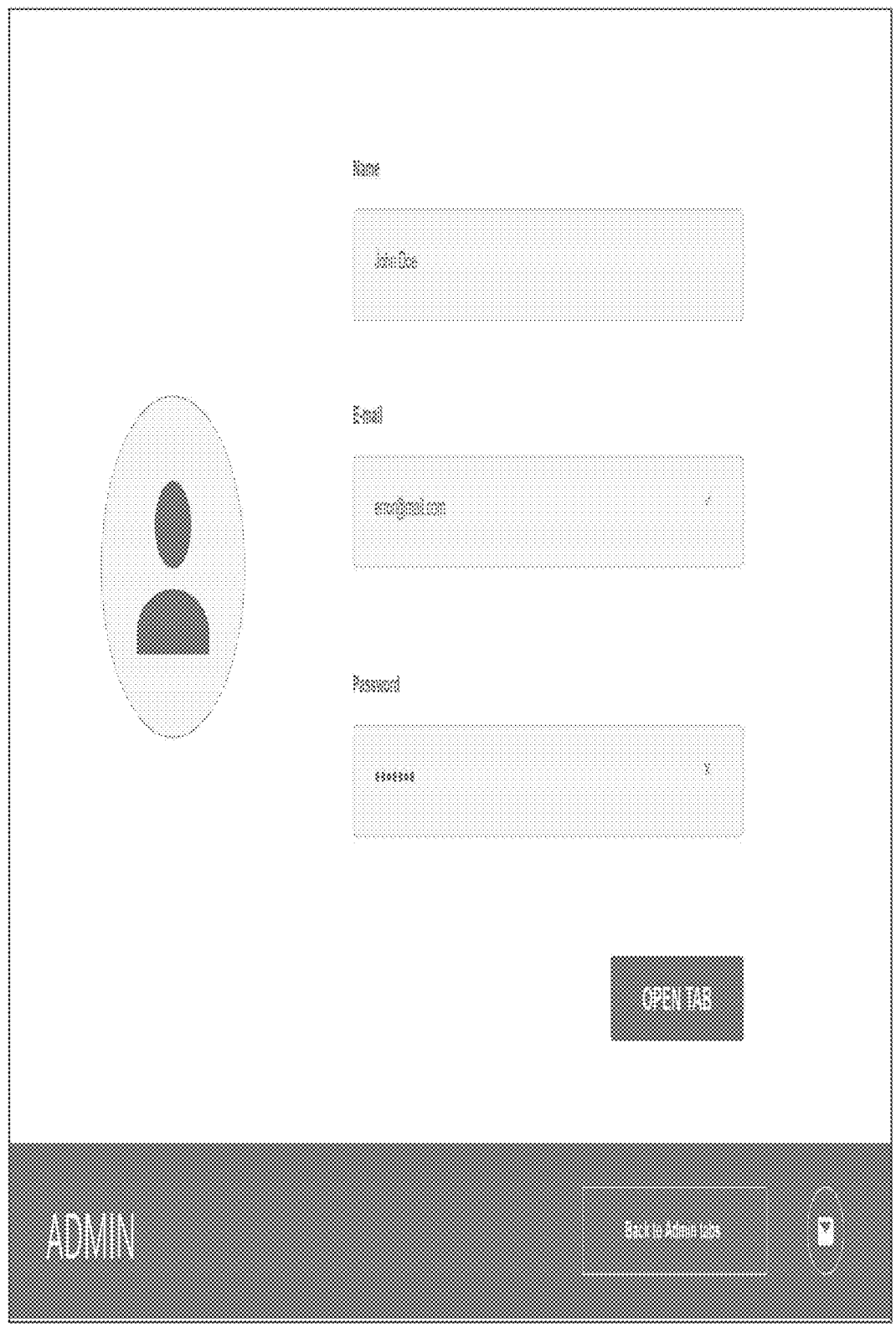
Figure 16:
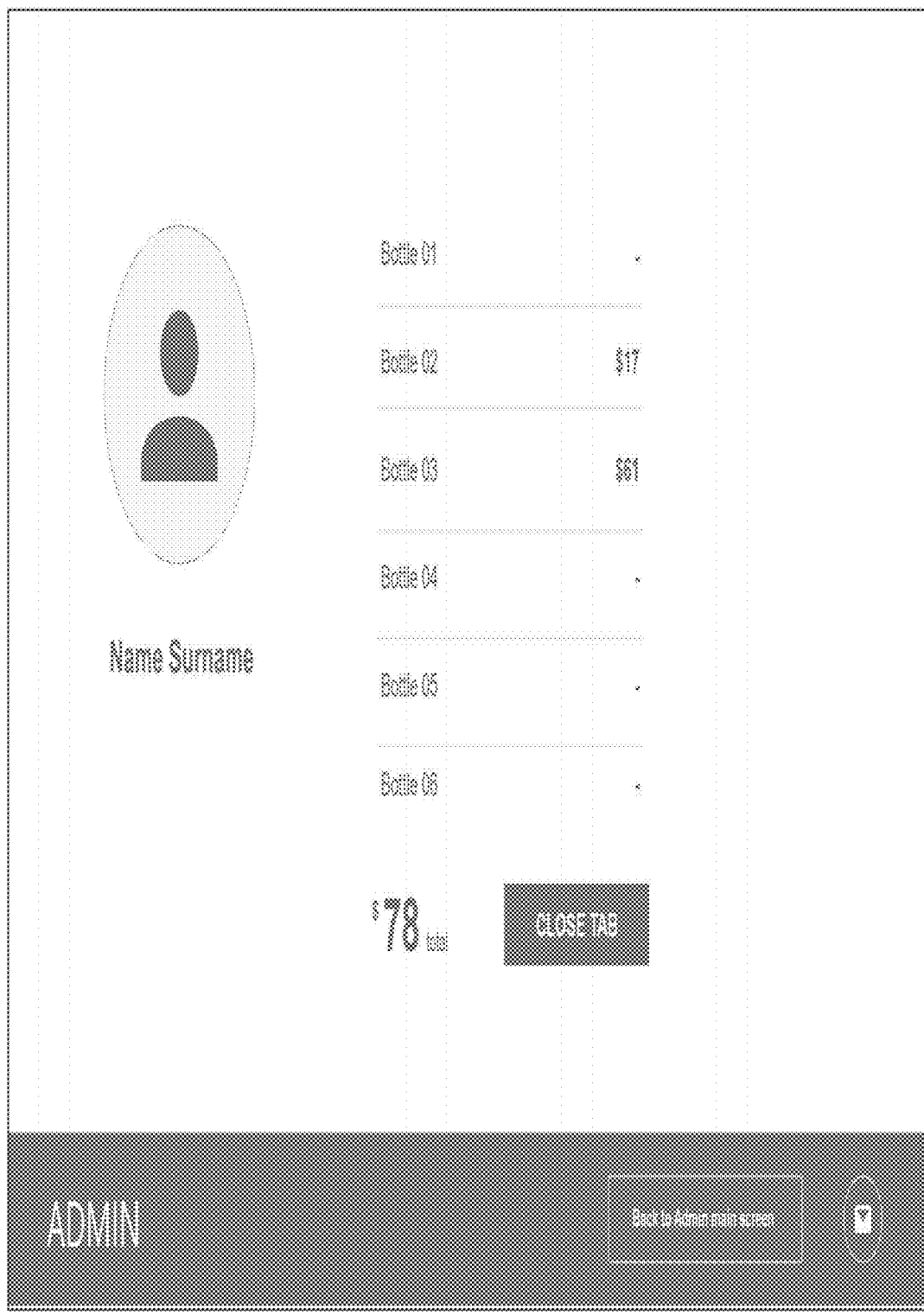
Figure 17:
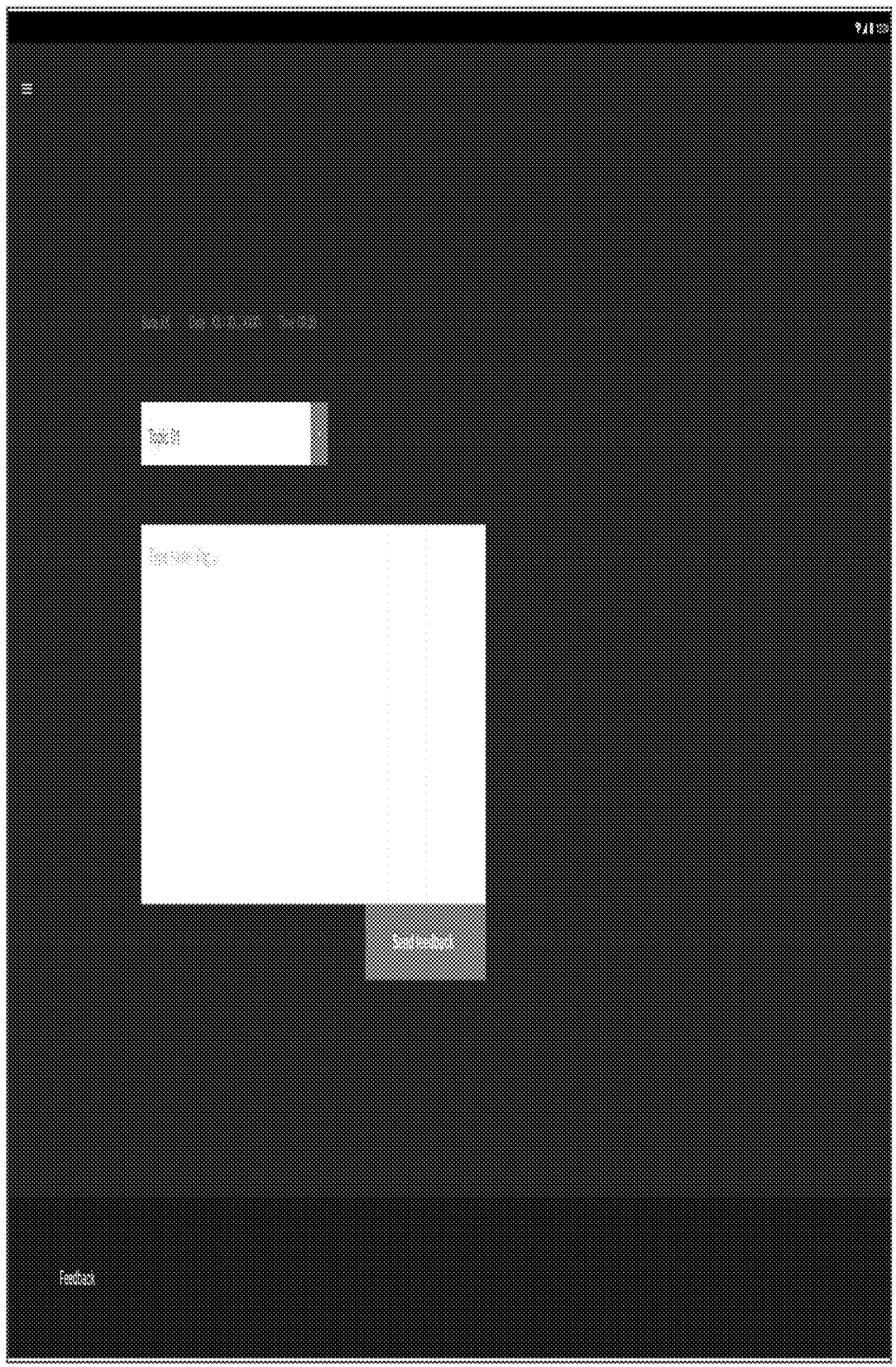

FIG. 8 illustrates screen shots that appear during various operations (collectively denoted 40) related to liquor consumption, monitoring and management. The screen shots 41, 48, 49, 50, 51, 52, 53, 54 and 55 are shown in FIGS. 9-17.

Figure 18:
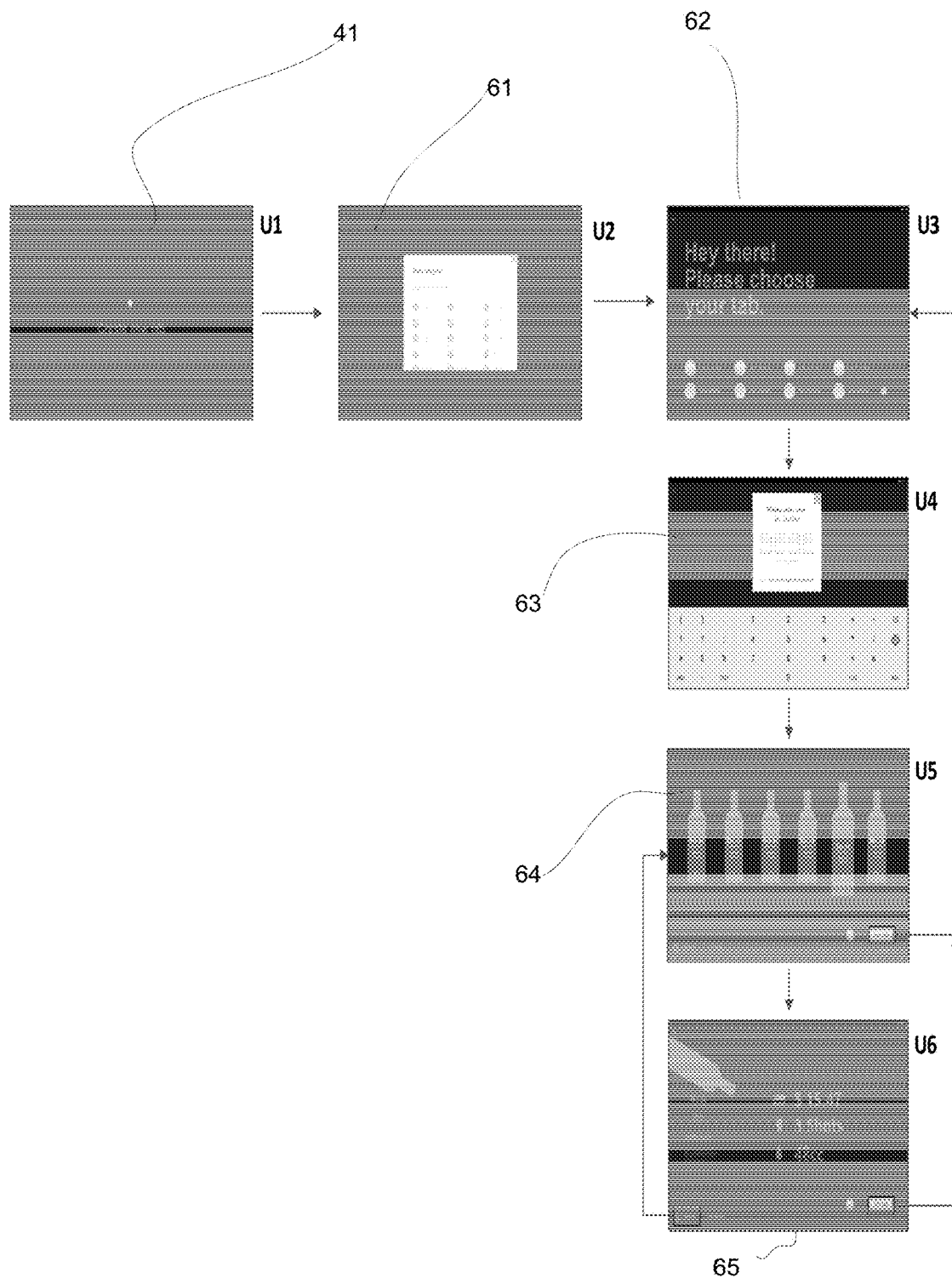
FIG. 18 illustrates examples of screen shots that appear during various operations related to liquor consumption, monitoring and management.
Figure 19:
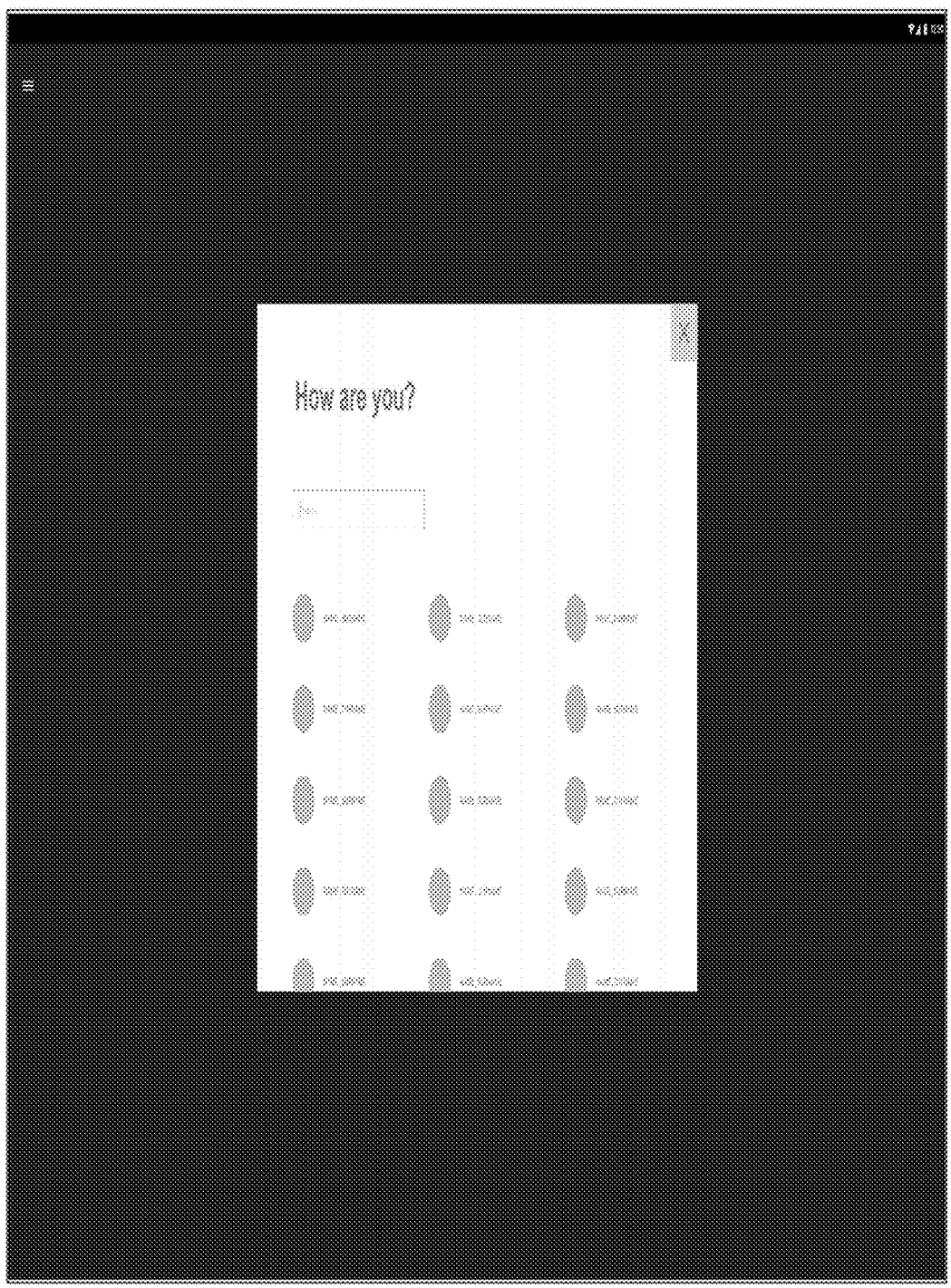
FIGS. 19-29 illustrate examples of screen shots.
Figure 20:
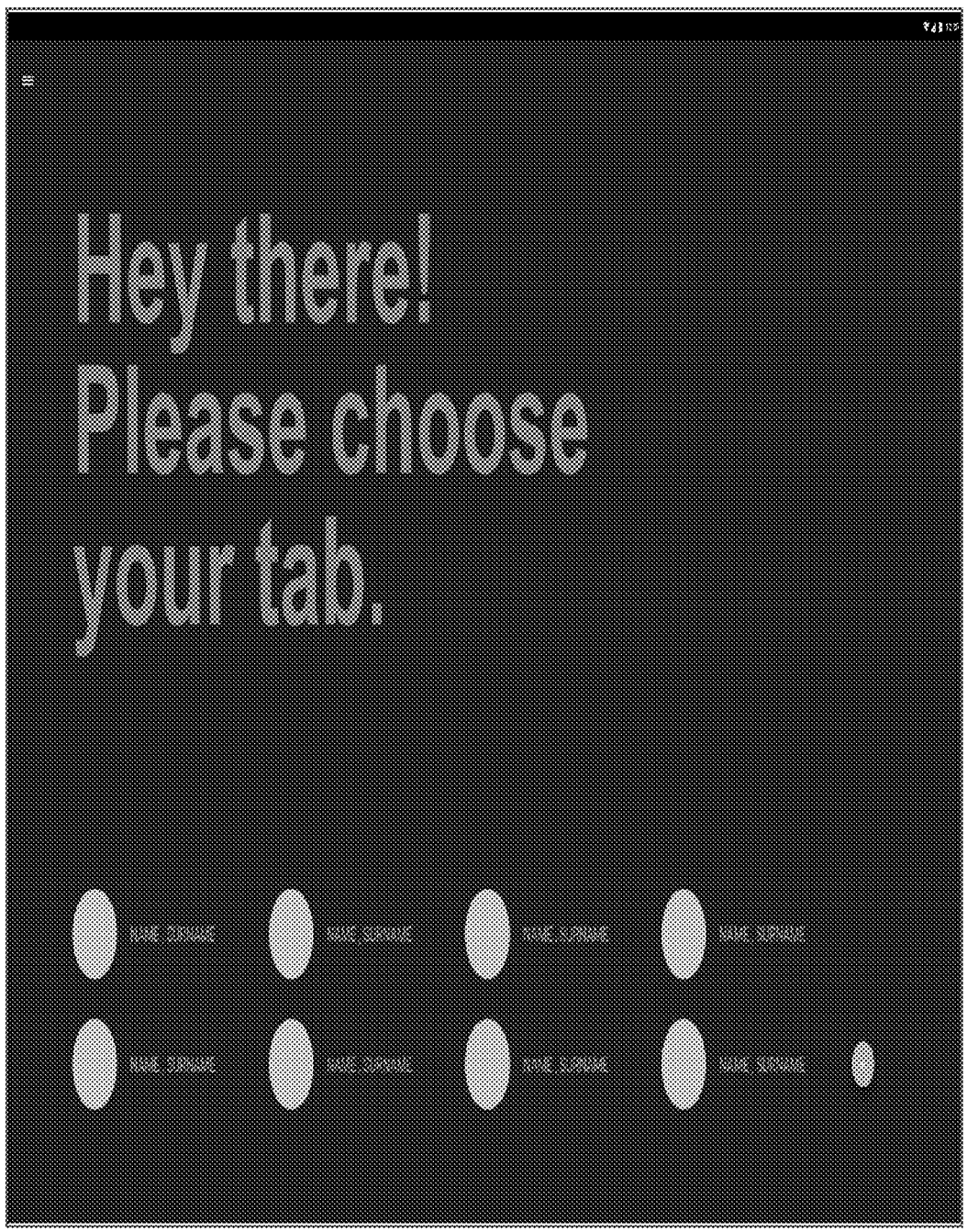
Figure 21:
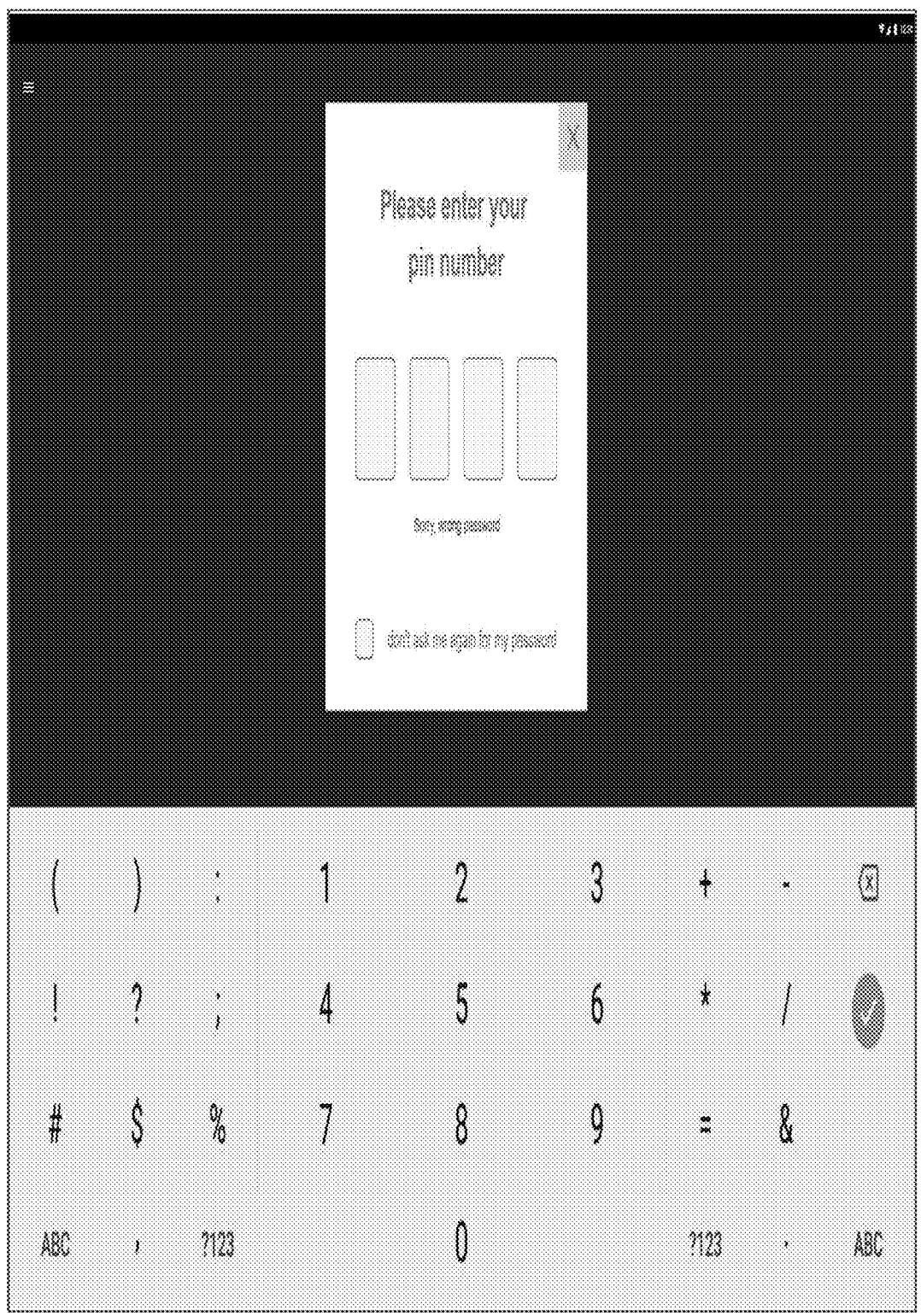
Figure 22:
Figure 23:
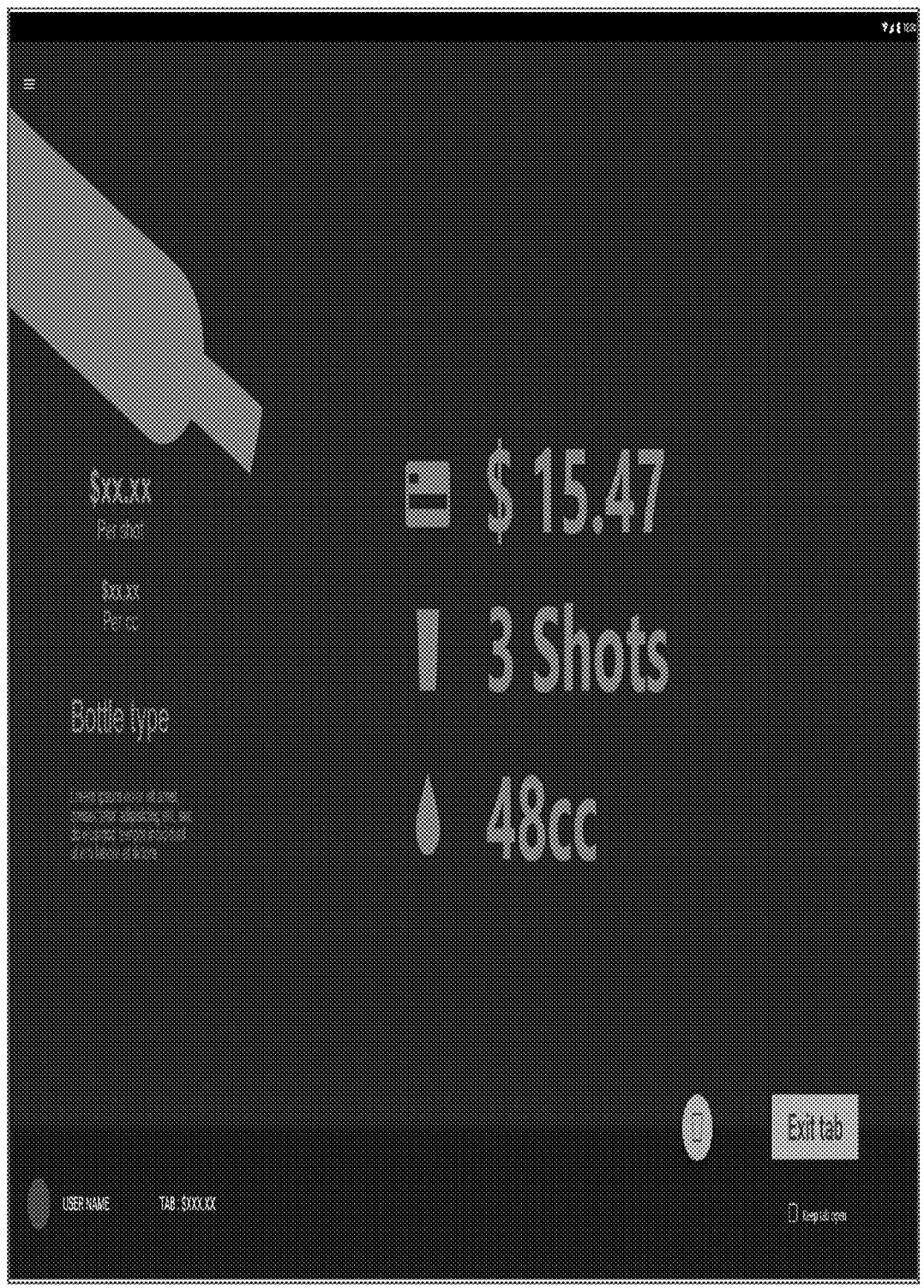
Figure 24:
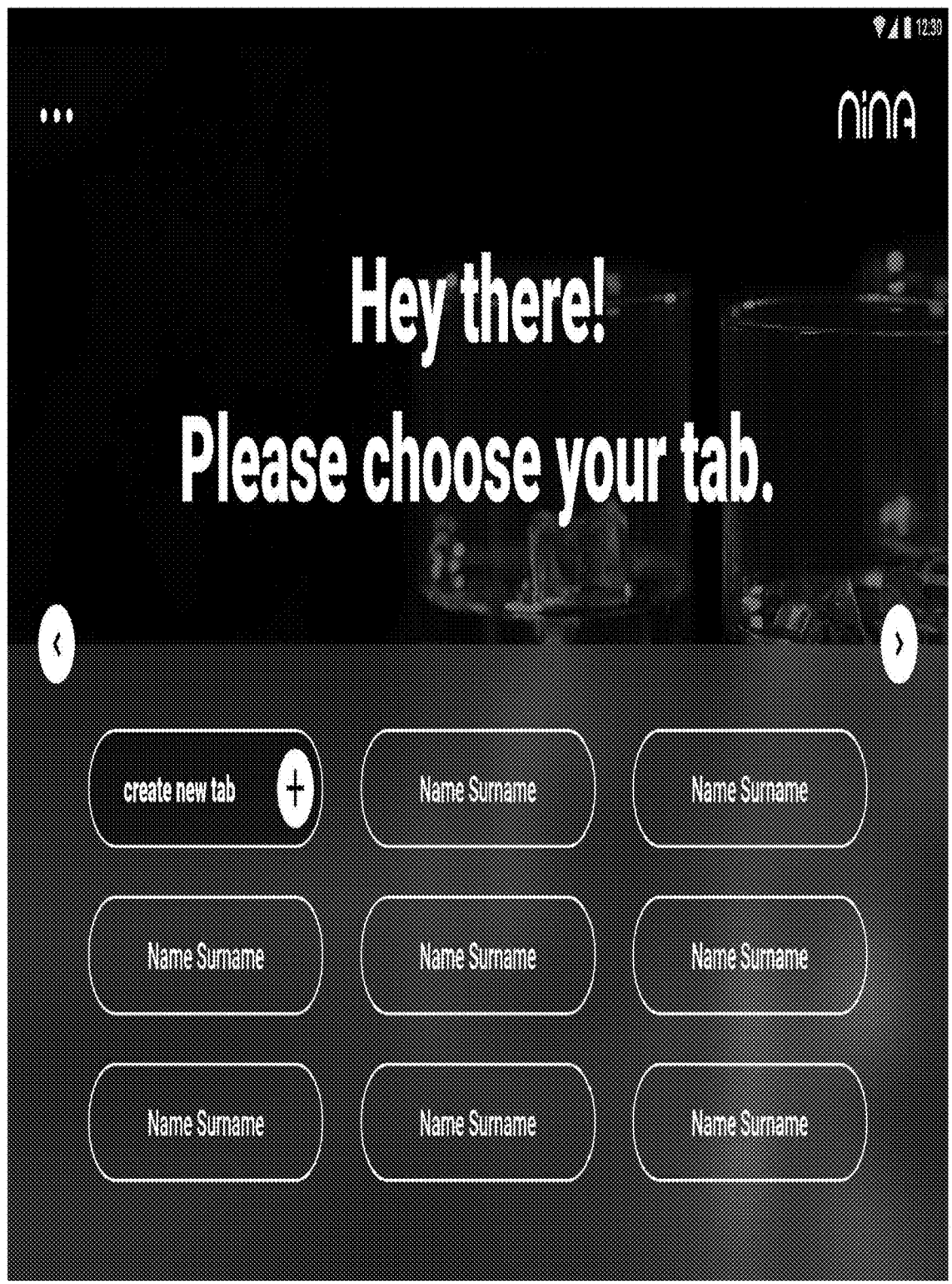
Figure 25:
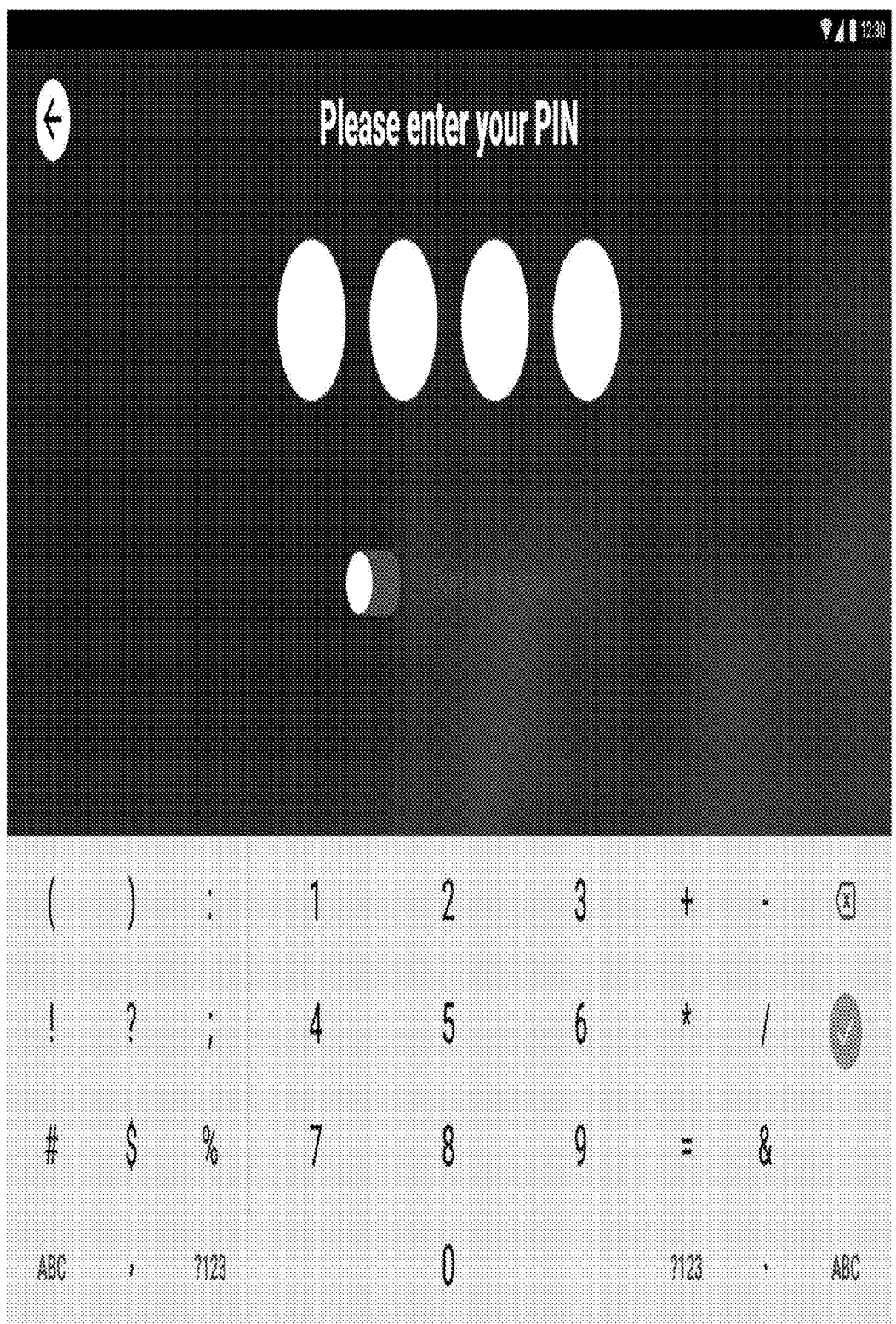
Figure 26:
Figure 27:
Figure 28:
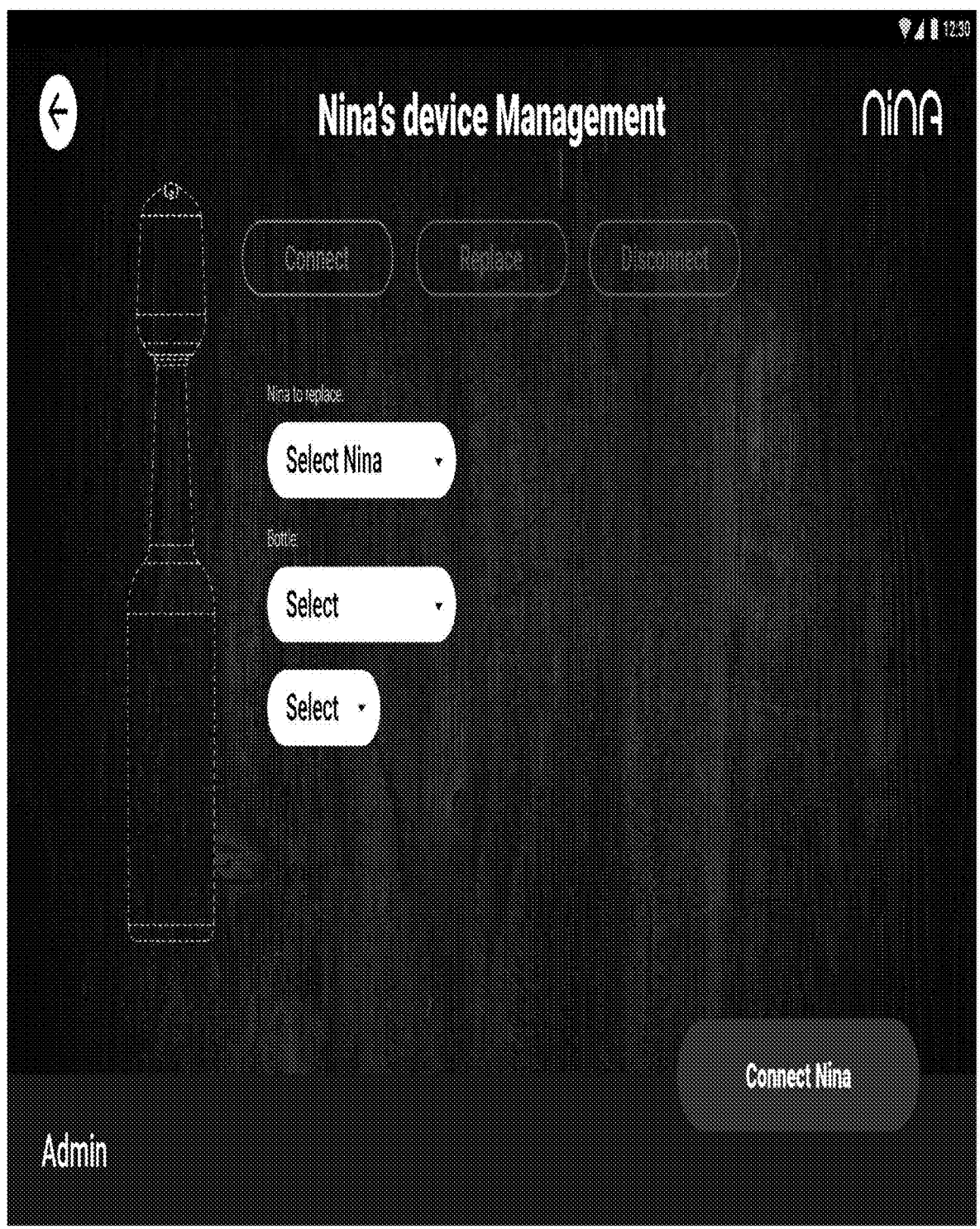
Figure 29:

FIG. 18 illustrates screen shots that appear during various operations (collectively denoted 60) related to liquor consumption, monitoring and management. The screen shots 41, 61, 62, 63, 64 and 65 are shown in FIGS. 9 and 19-23.

Various other screen shots 71, 72, 73, 74 and 75 are shown in FIGS. 24-29.

Figure 30:
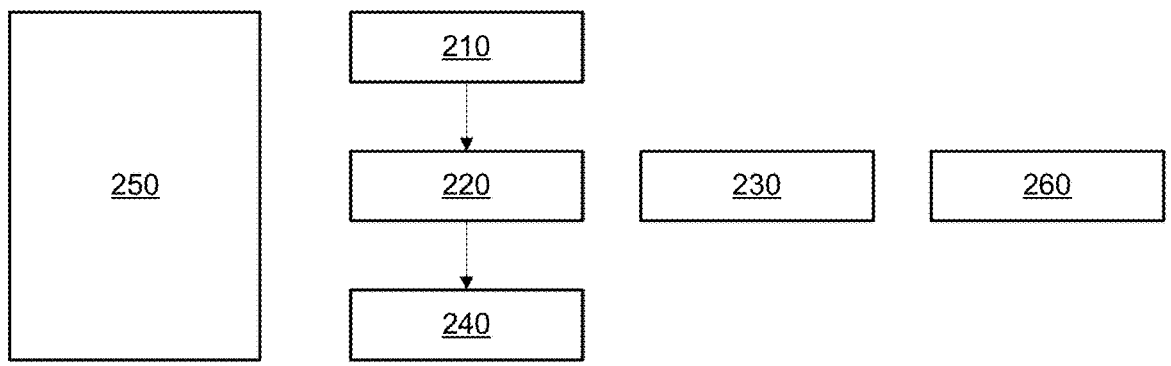
FIG. 30 illustrates an example of a method for controlled distribution of liquid from a bottle.

FIG. 30 illustrates an example of a method 200 for controlled distribution of liquid from a bottle.

Method 200 may include:
a. Step 210 of receiving, by a communication module of a controlled pourer, a command to output the liquid from the bottle during a liquid consumption iteration. The command may be received from a user device after the command is authorized (for example by the user device and/or by a system that manages the liquor consumption—especially after the funds required for the liquor consumption are guaranteed).
b. Step 220 of outputting the liquid from the bottle through a flow control mechanism according to the command, during the liquid consumption iteration. Step 220 follows step 210.
c. Step 230 of monitoring, by a flow meter of the controlled pourer, an amount of liquor outputted by the flow control mechanism during the liquor consumption iteration. Step 230 may be executed in parallel to step 220.
d. Step 240 of outputting, by the communication module, information regarding the amount of liquor consumed during the liquor consumption operation. Step 240 may follow step 220.
e. Step 250 of preventing, by the controlled pourer, a bypassing of the flow control mechanism, while the controlled pourer is locked to the bottle. Step 250 may be executing during the entire execution of steps 210, 220, 230 and 240.
f. Step 260 of providing, by a man machine interface of the controlled pourer, a human perceivable feedback regarding a progress of the outputting of the liquor. Step 260 may be executed in parallel to step 220.

Steps 210 and 220 may include at least one of the following:
a. Receiving a command to output a predefined amount of liquor during the liquor consumption iteration and outputting the predefined amount of liquor during the liquid consumption iteration.
b. Receiving a command to output a unspecified amount of liquor during the liquor consumption iteration and outputting the unspecified amount of liquor during the liquid consumption iteration.
c. Receiving the command over a secure link from a user device; detecting whether an execution of the liquid consumption iteration is funded; and preventing the outputting of the liquor during the liquid consumption iteration when the execution of the liquid consumption iteration is not funded.

Figure 31:
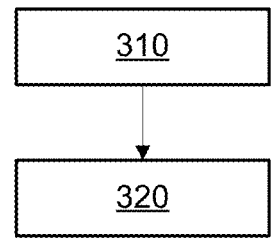
FIG. 31 illustrates an example of a method for controlled distribution of liquid from a bottle.

FIG. 31 illustrates an example of a method 300 for controlled distribution of liquid from a bottle.

Method 300 may include:
a. Step 310 of receiving, by a computerized systems, information regarding consumption of liquor from multiple bottles via multiple controlled pourers locked to the multiple bottles
b. Step 320 of processing the information to provide liquor consumption statistics and/or liquor inventory management decisions, and the like.

Examples of screenshots that may be presented during method 300 are shown in FIGS. 9-29. Examples of interactions between various entities involved in the execution of method 300 are shown in FIGS. 3-7.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A controlled pourer, comprising:
   a locking mechanism for locking the controlled pourer to a bottle;
   a communication module;
   a flow control mechanism that is configured to control an output of liquor, during a liquid consumption iteration, from the bottle under a control of one or more commands received by the communication module; and
   a flow meter for monitoring an amount of liquor outputted by the flow control mechanism during the liquor consumption iteration;
   an air conduit and a liquor conduit that pass through an entirety of a body of the controlled pourer, the body comprises the flow control mechanism, the communication module and the flow meter;
   wherein the communication module is configured to output information regarding the amount of liquor consumed during the liquor consumption operation; and
   wherein once locked to the bottle the controller pourer prevents a bypass of the liquor control mechanism.

2. The controlled pourer according to claim 1 comprising a man machine interface that is configured to provide human perceivable feedback regarding a progress of the outputting of the liquor.

3. The controlled pourer according to claim 1 wherein the controlled pourer is configured to enter a sleep mode.

4. The controlled pourer according to claim 1 comprising a battery positioned between the locking unit and the flow meter.

5. The controller pourer according to claim 1 wherein the flow control mechanism comprises a controllable valve.

6. The controlled pourer according to claim 1 wherein the flow control mechanism is configured to output a predefined amount of liquor during the liquid consumption iteration when receiving a command to output the predefined amount of liquor.

7. The controlled pourer according to claim 1 wherein the flow control mechanism is configured to output a unspecified amount of liquor during the liquid consumption iteration when receiving a command to output the a unspecified amount of liquor.

8. The controlled pourer according to claim 1 wherein once locked to the bottle, the controller pourer surrounds a neck of the bottle and selectively seals an opening of the bottle.

9. The controlled pourer according to claim 1 wherein a weight of the controlled pourer does not exceed a fraction of a kilogram.

10. The controlled pourer according to claim 1 wherein a height of the controlled pourer does not exceed ten centimeters.

11. The controlled pourer according to claim 1 wherein the communication module is a BLE compliant communication module.

12. The controlled pourer according to claim 1 wherein the flow meter is an ultrasonic flow meter.

13. A method for controlled distribution of liquid from a bottle, the method comprises:
   receiving, by a communication module of a controlled pourer, a command to output the liquid from the bottle during a liquid consumption iteration;
   outputting the liquid from the bottle through a flow control mechanism according to the command, during the liquid consumption iteration;
   monitoring, by a flow meter of the controlled pourer, an amount of liquor outputted by the flow control mechanism during the liquor consumption iteration;
   storing in the controlled pourer at least a part of a real-time updated and compact data base indicative of liquor consumption;
   outputting, by the communication module, information regarding the amount of liquor consumed during the liquor consumption operation; and
   preventing, by the controlled pourer, a bypassing of the flow control mechanism, while the controlled pourer is locked to the bottle.

14. The method according to claim 13 comprising providing, by a man machine interface of the controlled pourer, a human perceivable feedback regarding a progress of the outputting of the liquor.

15. The method according to claim 13 comprising receiving a command to output a predefined amount of liquor during the liquor consumption iteration and outputting the predefined amount of liquor during the liquid consumption iteration.

16. The method according to claim 13 comprising receiving a command to output an unspecified amount of liquor during the liquor consumption iteration and outputting the unspecified amount of liquor during the liquid consumption iteration.

17. The method according to claim 13 comprising receiving the command over a secure link from a user device; detecting whether an execution of the liquid consumption iteration is funded; and preventing the outputting of the liquor during the liquid consumption iteration when the execution of the liquid consumption iteration is not funded.

18. The method according to claim 13 wherein the controlled pourer comprises an air conduit and a liquor conduit that pass through an entirety of a body of the controlled pourer, the body comprises the flow control mechanism, the communication module and the flow meter.

19. The method according to claim 13 comprising entering a sleep mode by the controlled pourer.

20. A method for managing and monitoring consumption of liquor, the method comprises:
  receiving, by a computerized systems, information regarding consumption of liquor from multiple bottles via multiple controlled pourers locked to the multiple bottles; wherein the multiple controlled pourers are configured to store at least a part of a real-time updated and compact data base indicative of liquor consumption; and
  processing the information to provide liquor consumption statistics.

* * * * *